(12) United States Patent
Yoshii et al.

(10) Patent No.: US 8,397,017 B2
(45) Date of Patent: Mar. 12, 2013

(54) CONTROLLER AND DATA STORAGE DEVICE

(75) Inventors: Kenichiro Yoshii, Tokyo (JP); Kazuhiro Fukutomi, Kanagawa (JP); Shinichi Kanno, Tokyo (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 435 days.

(21) Appl. No.: 12/723,846

(22) Filed: Mar. 15, 2010

(65) Prior Publication Data

US 2011/0060864 A1    Mar. 10, 2011

(30) Foreign Application Priority Data

Sep. 8, 2009 (JP) ................. 2009-207121

(51) Int. Cl.
*G06F 13/00* (2006.01)
(52) U.S. Cl. ........ 711/103; 711/154; 711/173; 714/723; 707/999.107
(58) Field of Classification Search .................. 711/103, 711/154, 173; 707/999.107; 714/723
See application file for complete search history.

(56) References Cited

U.S. PATENT DOCUMENTS 5,574,902 A * 11/1996 Josten et al. .......................... 1/1
7,657,702 B2 * 2/2010 Conley ........................... 711/103
2004/0181560 A1 * 9/2004 Romanufa et al. ............ 707/202
2004/0260726 A1 * 12/2004 Hrle et al. ................... 707/104.1
2008/0154914 A1 * 6/2008 Kan et al. ........................ 707/10

FOREIGN PATENT DOCUMENTS

JP    2001-142774    5/2001

OTHER PUBLICATIONS

U.S. Appl. No. 12/883,796, filed Sep. 16, 2010, Fukutomi, et al.

* cited by examiner

*Primary Examiner* — Jae Yu
(74) *Attorney, Agent, or Firm* — Oblon, Spivak, McClelland, Maier & Neustadt, L.L.P.

(57) ABSTRACT

A volatile management memory stores management information for managing a use state of a storage medium. A management information storing unit divides the management information into plural division pieces and individually stores them in the storage medium. A main controller receives a command from a host device while the division pieces are being stored, performs data processing for the storage medium in response to the command between each division piece is stored, updates the management information divided into the division pieces according to the data processing content, and creates a log representing an update content of the management information. A log storing unit stores the log in the storage medium. A restoring unit reads the division pieces stored in the storage medium to the management memory as the management information, updates the management information according to the log stored in the storage medium, and restores the updated management information.

19 Claims, 25 Drawing Sheets

FIG.3

| LOGICAL ADDRESS | PHYSICAL ADDRESS |
|---|---|
| 0 | CHIP NUMBER 100, BLOCK NUMBER 10, PAGE NUMBER 27 |
| 1 | CHIP NUMBER 8, BLOCK NUMBER 1000, PAGE NUMBER 51 |
| 2 | CHIP NUMBER 20, BLOCK NUMBER 512, PAGE NUMBER 3 |
| ⋮ | ⋮ |
| 100 | CHIP NUMBER 11, BLOCK NUMBER 10, PAGE NUMBER 2 |
| 101 | CHIP NUMBER 608, BLOCK NUMBER 105, PAGE NUMBER 22 |
| 102 | NOT WRITTEN |
| ⋮ | ⋮ |

FIG.4

| BAD BLOCK LIST |
|---|
| CHIP NUMBER 15, BLOCK NUMBER 10 |
| CHIP NUMBER 8, BLOCK NUMBER 1000 |
| CHIP NUMBER 20, BLOCK NUMBER 512 |
| ⋮ |
| CHIP NUMBER 11, BLOCK NUMBER 10 |
| CHIP NUMBER 6, BLOCK NUMBER 105 |
| CHIP NUMBER 5, BLOCK NUMBER 0 |
| ⋮ |

FIG.5

| LOG TYPE: WRITING LOG |
|---|
| CHIP NUMBER AND BLOCK NUMBER OF OBJECT BLOCK |
| LOGICAL NUMBER OF DATA WRITTEN ON PAGE NUMBER 0 |
| LOGICAL NUMBER OF DATA WRITTEN ON PAGE NUMBER 1 |
| LOGICAL NUMBER OF DATA WRITTEN ON PAGE NUMBER 2 |
| ⋮ |
| LOGICAL NUMBER OF DATA WRITTEN ON PAGE NUMBER N-1 |

FIG.6

| LOG TYPE: BAD BLOCK LOG |
|---|
| CHIP NUMBER AND BLOCK NUMBER OF OBJECT BLOCK |
| CAUSE OF BAD BLOCK |
| OTHER INFORMATION |
| ⋮ |
| OTHER INFORMATION |

FIG.15

| LOG TYPE: STORAGE FINISHING LOG |
|---|
| MANAGEMENT INFORMATION IDENTIFIER |
| DIVISION NUMBER OF MANAGEMENT INFORMATION |
| POSITION ON FLASH MEMORY AT WHICH DIVISION PIECE 1 IS STORED |
| SIZE OF DIVISION PIECE 1 |
| ⋮ |
| POSITION ON FLASH MEMORY AT WHICH DIVISION PIECE N IS STORED |
| SIZE OF DIVISION PIECE N |

| LOG TYPE: STORAGE FINISHING LOG |
|---|
| MANAGEMENT INFORMATION A |
| 4 |
| Sa |
| 5 BLOCKS |
| Sb |
| 5 BLOCKS |
| Sc |
| 5 BLOCKS |
| Sd |
| 5 BLOCKS |

FIG.27

| | |
|---|---|
| Ll | STORAGE START LOG OF MANAGEMENT INFORMATION B |
| Lm | LOG 30 |
| Ln | LOG 31 |
| Lo | LOG 32 |
| Lp | LOG 33 |
| Lq | LOG 34 |
| Lr | LOG 35 |
| Ls | LOG 36 |
| Lt | STORAGE FINISHING LOG OF MANAGEMENT INFORMATION B |
| Lu | LOG 37 |
| Lv | LOG 38 |
| Lw | LOG 39 |
| Lx | LOG 40 |
| Ly | LOG 41 |
| Lz | |

FIG.28

| | |
|---|---|
| Se | DIVISION PIECE 1 OF MANAGEMENT INFORMATION B |
| Sf | DIVISION PIECE 2 OF MANAGEMENT INFORMATION B |
| Sg | DIVISION PIECE 3 OF MANAGEMENT INFORMATION B |
| Sh | DIVISION PIECE 4 OF MANAGEMENT INFORMATION B |
| Si | |

FIG.29

| |
|---|
| LOG TYPE: STORAGE FINISHING LOG |
| MANAGEMENT INFORMATION B |
| 4 |
| Se |
| 5 BLOCKS |
| Sf |
| 5 BLOCKS |
| Sg |
| 5 BLOCKS |
| Sh |
| 5 BLOCKS |

FIG.30

| |
|---|
| LOG TYPE: WRITING LOG |
| CHIP NUMBER 9, BLOCK NUMBER 987 |
| LOGICAL ADDRESS 98 |
| LOGICAL ADDRESS 23785 |
| LOGICAL ADDRESS 83780 |
| ⋮ |
| LOGICAL ADDRESS 138945 |

FIG.31

| |
|---|
| LOG TYPE: BAD BLOCK LOG |
| CHIP NUMBER 12, BLOCK NUMBER 1122 |
| CAUSE OF BAD BLOCK: ERASE ERROR |

CONTROLLER AND DATA STORAGE DEVICE

CROSS-REFERENCE TO RELATED APPLICATIONS

This application is based upon and claims the benefit of priority from the prior Japanese Patent Application No. 2009-207121, filed on Sep. 8, 2009; the entire contents of which are incorporated herein by reference.

BACKGROUND OF THE INVENTION

1. Field of the Invention

The present invention relates to a controller and a data storage device.

2. Description of the Related Art

In data storage devices such as a hard disk drive (HDD) and a solid state drive (SSD), the use state of a storage medium is managed by using various pieces of management information including a translation table. In the translation table, a logical address and a physical address of a storage medium are made to correspond to each other. In recent years, as the capacity of a data storage device increases, the size of management information tends to increase.

JP-A 2001-142774 (KOKAI) discloses a technique in which a part of a translation table stored in a non-volatile memory is read out as needed to a volatile memory and used. In the technique disclosed in JP-A 2001-142774 (KOKAI), reading out a part of the translation table from the non-volatile memory to the volatile table causes an overhead. Therefore, even though the size of the management information is increased, all of the management information needs to be stored in the volatile memory.

Because such a data storage device cannot function as a data storage device if the management information is lost, the management information needs to be stored in a storage medium at arbitrary timing. However, if the size of the management information is increased, it takes more time than before to store the management information. Furthermore, if all commands from a host device are interrupted while the management information is being stored, the performance significantly deteriorates.

SUMMARY OF THE INVENTION

According to an aspect of the present invention, a controller includes a volatile management memory which stores management information for managing a use state of a storage medium; a management information storing unit which divides the management information into a plurality of division pieces and individually stores each division piece in the storage medium; a main controller which receives a command from a host device while the plurality of division pieces are being stored, performs data processing with respect to the storage medium in response to the command between each division piece is stored, updates the management information divided into the plurality of division pieces in accordance with a content of the data processing, and creates a log representing an update content of the management information; a log storing unit which stores the log in the storage medium; and a restoring unit which reads out the plurality of division pieces stored in the storage medium to the management memory as the management information, updates the management information in accordance with the log stored in the storage medium, and restores the updated management information.

According to another aspect of the present invention, a data storage device includes the controller; and a storage medium for which the data processing is performed by the controller.

BRIEF DESCRIPTION OF THE DRAWINGS

FIG. 3 is a view illustrating a translation table;
FIG. 4 is a view illustrating a bad block list;
FIG. 5 is a view illustrating a writing log;
FIG. 6 is a view illustrating a bad block log;
FIG. 15 is a view illustrating a storage finishing log;
FIG. 27 is a schematic view illustrating a state of the log area in the embodiment;
FIG. 28 is a schematic view illustrating a state of the management information area in the embodiment;
FIG. 29 is a view illustrating a storage finishing log of management information B;
FIG. 30 is a view illustrating a writing log;
FIG. 31 is a view illustrating a bad block log.

DETAILED DESCRIPTION OF THE INVENTION

Hereinafter, embodiments of a controller and a data storage device according to the invention will be described with reference to the accompanying drawings. In the embodiment, a solid state drive (SSD) is described as an example of a data storage device, but the invention is not limited thereto.

First, a configuration of a data storage device according to the embodiment is described.

Figure 1:
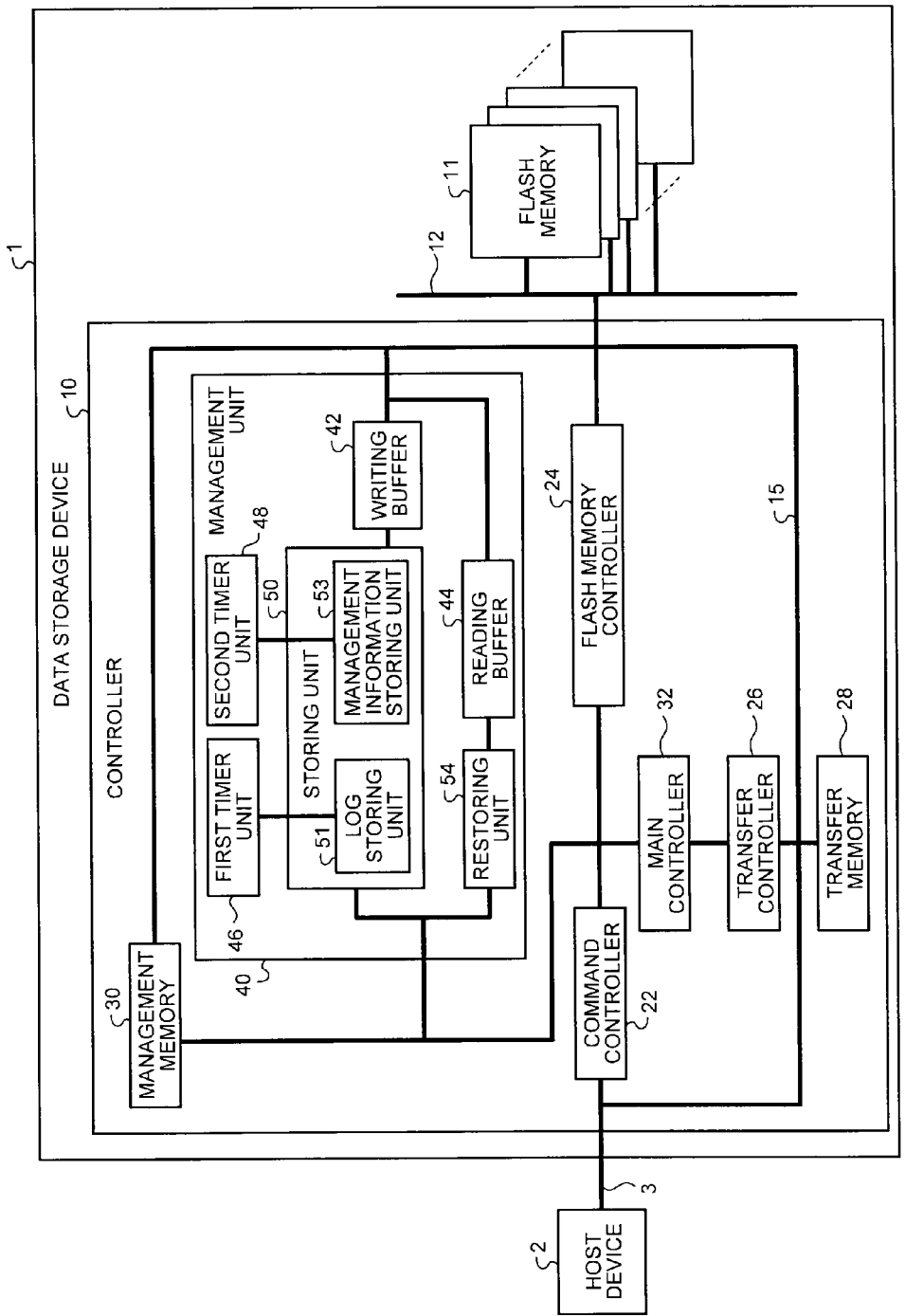
FIG. 1 is a block diagram illustrating a data storage device according to an embodiment.

FIG. 1 is a block diagram illustrating an example of a configuration of a data storage device 1 according to the embodiment. As illustrated in FIG. 1, the data storage device 1 is connected to a host device 2 such as a server or a personal computer (PC) via an external bus 3. The data storage device 1 includes a controller 10 and plural flash memories 11 (an example of a storage medium). The controller 10 and the flash memories 11 are connected to each other via a dedicated bus 12. The host device 2 and the flash memories 11 are connected to each other via the external bus 3, a data bus 15 in the controller 10, and the dedicated bus 12. The flash memory 11 is an NAND type flash memory.

The controller 10 receives various commands from the host device 2 and performs various pieces of data processing with respect to the flash memory 11. The controller 10 includes a command controller 22, a flash memory controller 24, a transfer controller 26, a transfer memory 28, a management memory 30, a main controller 32, and a management unit 40.

The command controller 22 is connected with the host device 2 via the external bus 3. The command controller 22 receives various commands such as a read command and a write command transmitted from the host device 2 and transmits a response thereto to the host device 2.

The flash memory controller 24 is connected with the flash memories 11 via the dedicated bus 12. The flash memory controller 24 performs data process such as data reading or writing with respect to the flash memory 11 in response to various commands received by the command controller 22 or a command from the management unit 40 which will be described later.

The transfer controller 26 is connected to the data bus 15 and performs data transfer between the host device 2 and the flash memory 11. Specifically, the transfer controller 26 receives an instruction from the command controller 22 or the flash memory controller 24 and transmits data stored in the transfer memory 28 connected to the data bus 15 to the host device 2 or the flash memory 11. The transfer controller 26 may be implemented by, for example, a direct memory access controller (DMAC).

The transfer memory 28 temporarily stores transfer data until data transfer is performed by the transfer controller 26. Specifically, the transfer memory 28 temporarily stores data to be written from the host device or data to be read out from the flash memory 11. The transfer memory 28 may be implemented by, for example, a volatile memory such as a dynamic random access memory (DRAM).

In the embodiment, the transfer memory 28 stores both of data for the command controller 22 and data for the flash memory controller 24, but a data transfer memory which stores data for the command controller 22 and a data transfer memory which stores data for the flash memory controller 24 may be separately provided.

The management memory 30 stores management information for managing a use state of the flash memory 11 and may be implemented by, for example, a volatile memory such as a DRAM.

Figure 2:
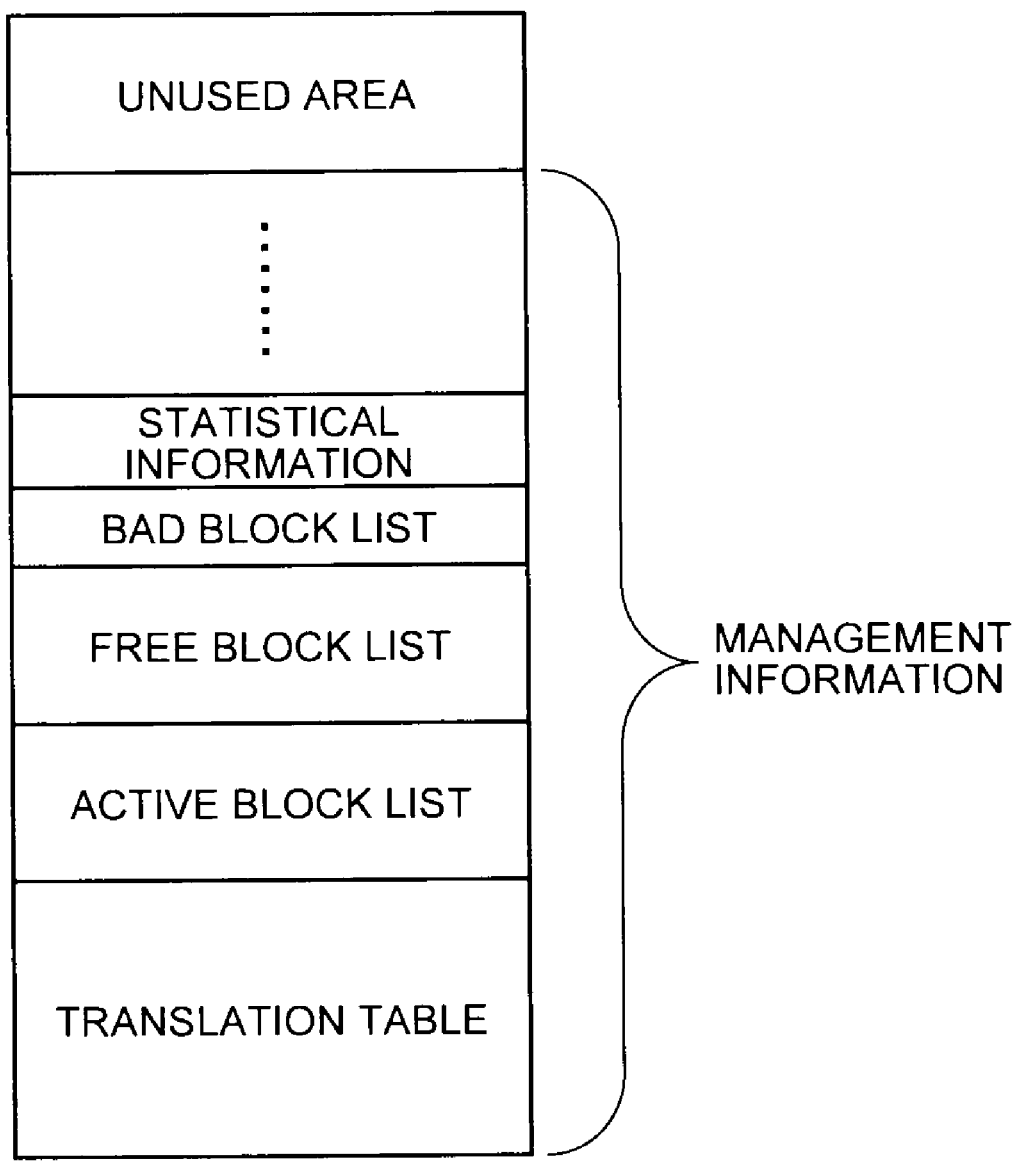
FIG. 2 is a configuration view illustrating data stored in a management memory in the embodiment.

FIG. 2 is a view illustrating a configuration example of data stored in the management memory 30 in the embodiment. As illustrated in FIG. 2, information such as a translation table, an active block list, a free block list, a bad block list, and statistical information is stored in the management memory 30 as the management information. An area in which information is not stored is an unused area.

The translation table is a table (information) in which a logical address representing a virtual position of an area on the flash memory 11 and a physical address representing a physical position on the flash memory 11 are made to correspond to each other. The active block list is a list (information) for managing a block of the flash memory 11 which stores valid data. The free block list is a list (information) for managing a block of the flash memory 11 which can store new data. The bad block list is a list (information) for managing a block of the flash memory 11 which cannot be used. The statistical information is information representing statistics of a command transmitted from the host device 2.

In the embodiment, since the size of each information, which forms the management information, is increased and decreased, a maximum size of each information is estimated in advance, and an area corresponding to the maximum size is secured on the management memory 30 for each information. A data format of the management information is not limited to a certain format.

FIG. 3 is a view illustrating an example of the translation table. In an example illustrated in FIG. 3, the physical address includes a chip number, a block number, and a page number of the flash memory 11. When data is not written in the physical address yet, data representing an unwritten state is stored in the physical address.

FIG. 4 is a view illustrating an example of the bad block list. In an example illustrated in FIG. 4, a block of the flash memory 11 which cannot be used is specified by using the chip number and the block number. The active block list and the free block list are not explained in detail here, but a block to be specified is specified using the chip number and the block number similarly to the bad block list.

Referring back to FIG. 1, the main controller 32 controls operations of the command controller 22, the flash memory controller 24, and the transfer controller 26. The main controller 32 controls data transfer between the host device 2 and the flash memory 11 by controlling operations of the controllers.

The main controller 32 manages data stored in the flash memory 11 by using the management information stored in the management memory 30. Specifically, the main controller 32 manages data stored in the flash memories 11 by referring to or updating the managing information in response to a content of a command transmitted from the host device 2.

The main controller 32 instructs the management unit 40, which will be described later, to store the management information or a log representing an update content of the management information in the flash memory 11 or to restore the management information from the management information or the log stored in the flash memory 11.

The management unit 40 stores the management information, which is stored in the management memory 30, in the flash memory 11 or restores the management information from the flash memory 11 to the management memory 30. The management unit 40 is connected with the management memory 30 and the flash memory controller 24 via an internal bus and connected with the flash memory 11 via the data bus 15. The management unit 40 includes a writing buffer 42, a reading buffer 44, a first timer unit 46, a second timer unit 48, a storing unit 50, and a restoring unit 54.

The writing buffer 42 is connected with the flash memory 11 via the data bus 15 and temporarily stores a log before it is stored in the flash memory 11. The writing buffer 42 may be implemented by, for example, a volatile memory such as a DRAM.

The reading buffer 44 is connected with the flash memory 11 via the data bus 15 and temporarily stores a log read out from the flash memory 11. The reading buffer 44 may be implemented by, for example, a volatile memory such as a DRAM.

The first timer unit 46 is a timer for a log storage process in which all logs stored in the writing buffer 42 are stored in the flash memory 11. The first timer unit 46 sets a time by an instruction from the storing unit 50 which will be described later to start its operation. When an operation of the first timer unit 46 is not stopped by the storing unit 50 and the set time elapses, the first timer unit 46 notifies the storing unit 50 that the set time has elapsed and instructs execution of the log storage process.

The second timer unit 48 is a timer for a management information storage process in which the management information stored in the management memory 30 is stored in the flash memory 11. The second timer unit 48 sets a time by an instruction from the storing unit 50 which will be described later to start its operation. When an operation of the second timer unit 48 is not stopped by the storing unit 50 and the set time elapses, the second timer unit 48 notifies the storing unit 50 that the set time has elapsed and instructs execution of the management information storage process.

A method of using the first timer unit 46 and the second timer unit 48 is not limited to the above method. The first timer unit 46 and the second timer unit 48 may be eliminated.

The storing unit 50 is connected with the main controller 32 via the internal bus. The storing unit 50 receives a log storing request or a management information storing request from the main controller 32 and transmits a command for storing the log or the management information in the flash memory 11 to the flash memory controller 24. As a result, the log or the management information is stored in the flash memory 11. The storing unit 50 includes a log storing unit 51 and a management information storing unit 53.

The log storing unit 51 receives the log storing request from the main controller 32 and writes the log in the writing buffer 42. The log storing unit 51 manages an overall size, a use size, and an empty size of the writing buffer 42 and also manages a position on the writing buffer 42, at which a log is to be written next, using a pointer (hereinafter, referred to as a "pointer for the writing buffer 42").

When the log written in the writing buffer 42 is the log that has to be immediately stored in the flash memory 11 or when execution of the log storage process is instructed from the first timer unit 46, the log storing unit 51 stores the log written in the writing buffer 42 in an area on the flash memory 11 (hereinafter, referred to as a "log area") which stores the log.

The log storing unit 51 manages a physical position, an overall size, a use size, and an empty size of the log area and also manages a position on the log area, at which the log is to be written next, using a pointer (hereinafter, referred to as a "pointer for the log area"). Specifically, in a NAND type flash memory such as the flash memory 11, since a minimum writing unit is a page and an erasing unit is a block, the log storing unit 51 manages a physical position and an overall size of a block of the flash memory 11 allocated to the log area. Furthermore, the log storing unit 51 manages an empty size of the log area based on the number of remaining writable blocks and the number of remaining writable pages of the flash memory 11 allocated to the log area.

The log stored in the log storing unit 51 includes a writing log generated when data is written in the flash memory 11 or a bad block log generated when a block becomes a bad block.

The writing log is a log representing an area of the flash memory 11 in which data is written and represents an update content of the translation table. FIG. 5 is a view illustrating an example of the writing log. As illustrated in FIG. 5, the writing log includes a log type representing the writing log, a chip number and a block number of an object block, and a logical address of data which is written on each page of an object block. The writing log does not need to be immediately stored in the flash memory 11, but it is preferable to store the writing log in the flash memory 11 as quickly as possible.

The bad block is generated due to, for example, an erase failure of a block, a writing failure, and an error correction failure at the time of reading. In the NAND type flash memory, occurrence of the bad block is important information in supposing the lifespan of a system. FIG. 6 is a view illustrating an example of the bad block log. The bad block log includes a log type representing the bad block log, a chip number and a block number of an object block, a cause of the bad block, and other additional information. The bad block log is preferably immediately stored in the flash memory 11.

When the management information storing request from the main controller 32 is received or execution of the management information storage process is instructed from the second timer unit 48, the management information storing unit 53 divides the management information stored in the management memory 30 into plural division pieces and individually stores each division piece in an area on the flash memory 11 (hereinafter, referred to as a "management information area") in which the management information is stored.

The management information storing unit 53 manages a physical position, an overall size, a use size, and an empty size of the management information area and also manages a position on the management information area, at which the management information is to be written next, using a pointer (hereinafter, referred to as a "pointer for the management information area"). Specifically, the management information storing unit 53 manages a physical position and an overall size of a block of the flash memory 11 allocated to the management information area. Furthermore, the management information storing unit 53 manages an empty size of the management information area based on the number of remaining writable blocks and the number of remaining writable pages of the flash memory 11 allocated to the management information area.

The restoring unit 54 is connected with the main controller 32 via the internal bus. The restoring unit 54 receives a management information restoring request from the main controller 32 and transmits a command for reading out the log and the management information from the flash memory 11 to the flash memory controller 24. The restoring unit 54 reads out plural division pieces stored in the flash memory 11 to the management memory 30 as the management information, reads out the log from the flash memory 11 to the reading buffer 44, updates the management information in accordance with the read log, and restores the updated management information.

Next, a log storing operation performed by the data storage device according to the embodiment is described.

Figure 7:
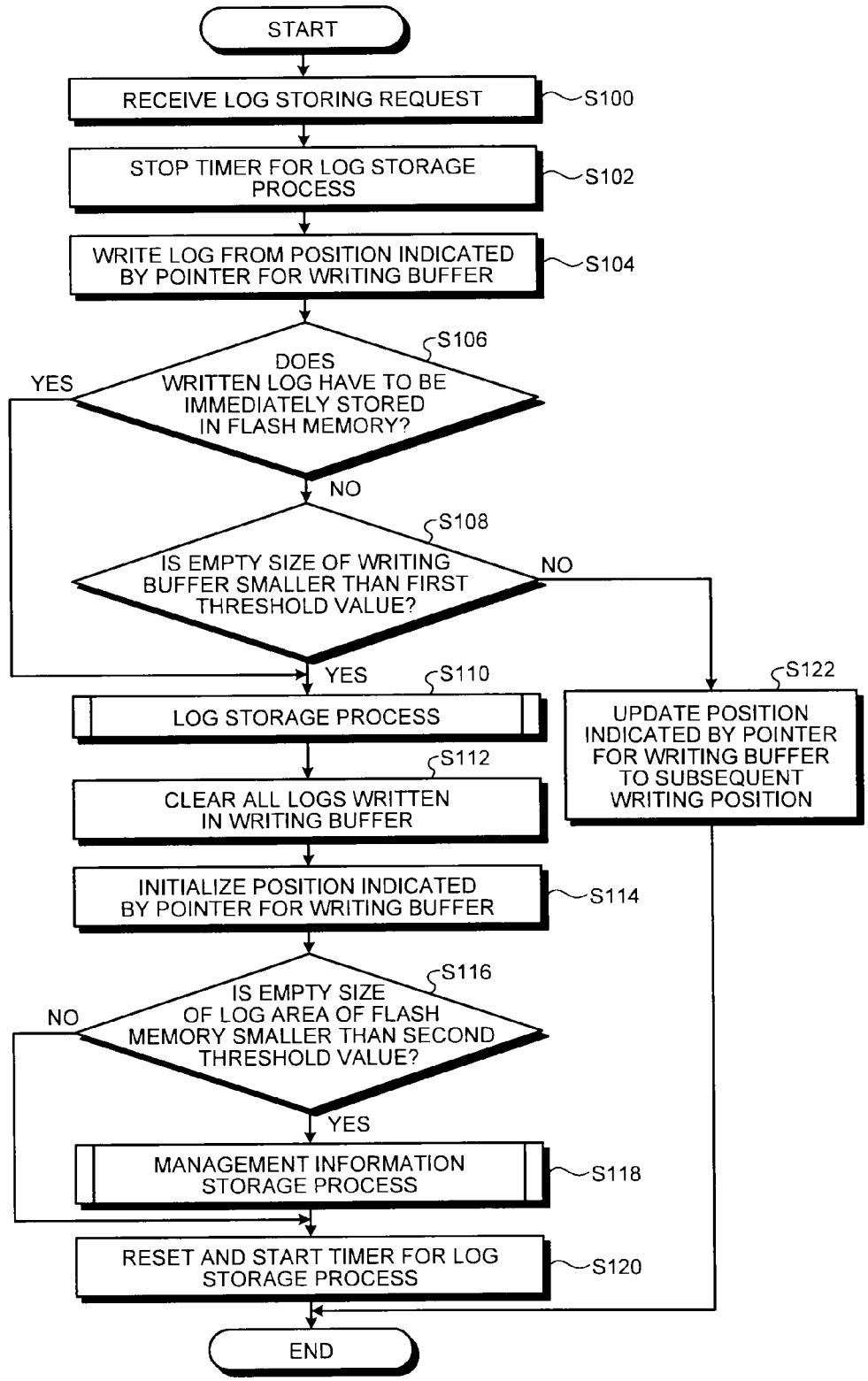
FIG. 7 is a flowchart illustrating a log storing operation procedure in the embodiment.

FIG. 7 is a flowchart illustrating an example of the flow of a log storing operation procedure performed by the data storage device 1 according to the embodiment.

First, when an update of the management information is performed by the main controller 32, the log storing unit 51 receives the log storing request from the main controller 32 (step S100). The log storing request includes at least a log representing an update content of the management information, a log size, and determination information for determining whether to immediately store in the flash memory 11.

Subsequently, the first timer unit 46 receives an instruction from the log storing unit 51 and stops the timer for log storage process (step S102). Therefore, it is possible to prevent the first timer unit 46 from instructing the log storing unit 51 to execute the log storage process during the log storing operation.

Subsequently, the log storing unit 51 extracts a log from the log storing request, processes the extracted log, and writes the processed log from a position indicated by the pointer for the writing buffer 42 (step S104). For example, the log storing unit 51 processes the log to a log having the same size as a page or a log having the same size as a block by adding size adjusting data to the log extracted from the log storing request.

Subsequently, the log storing unit 51 determines whether or not the log written in the writing buffer 42 is a log which has to be immediately stored in the flash memory 11 by using the determination information included in the log storing request (step S106).

When the log written in the writing buffer 42 is not the log which has to be immediately stored (No in step S106), the log storing unit 51 determines whether or not the empty size of the writing buffer 42 is smaller than a first threshold value (step S108). As the first threshold value, for example, a maximum size of a log to be written in the writing buffer 42 may be set. Therefore, it is not necessary to check the empty size before writing the log in the writing buffer 42.

When the log written in the writing buffer 42 is the log which has to be immediately stored (Yes in step S106) or when the empty size of the writing buffer 42 is smaller than the first threshold value (Yes in step S108), the log storing unit 51 performs the log storage in which all logs written in the writing buffer 42 are stored in the log area of the flash memory 11 (step S110). The details of the log storage process will be described later.

Subsequently, when the log storage process is finished, the log storing unit 51 clears all logs written in the writing buffer 42 (step S112). When the writing buffer 42 is implemented by the volatile memory such as a DRAM as in the embodiment, the process of step S112 may be omitted.

Subsequently, the log storing unit 51 initializes a position indicated by the pointer for the writing buffer 42 (step S114). Since the writing buffer 42 is used starting from the beginning in the embodiment, the log storing unit 51 returns a position indicated by the pointer for the writing buffer 42 to the beginning position of the writing buffer 42.

Subsequently, the log storing unit 51 determines whether or not the empty size of the log area of the flash memory 11 is smaller than a second threshold value (step S116). Since a maximum size of a log written in the log area at a time is a log corresponding to a size of the writing buffer 42 in the embodiment, a size of the writing buffer 42 may be set as the second threshold value, for example.

Subsequently, when the empty size of the log area is smaller than the second threshold value (Yes in step S116), the log storing unit 51 forcibly performs the management information storage process (step S118). The details of the management information storage process will be described later. Since an unnecessary log stored in the log area is freed by the management information storage process, the empty size of the log area can be increased. When the empty size of the log area is larger than the second threshold value (No in step S116), the log storing unit 51 does not perform the management information storage process of step S118.

Subsequently, the first timer unit 46 receives an instruction from the log storing unit 51, resets a time of the timer for log storage process, and starts the timer for log storage process (step S120).

When it is determined in step S108 that the empty size of the writing buffer 42 is larger than the first threshold value (No in step S108), the log storing unit 51 moves a position indicated by the pointer for the writing buffer 42 by a size of a log written in the writing buffer 42 and updates the position as a next writing position (step S122). The log storing unit 51 updates the use size and the empty size of the writing buffer 42 and finishes the process.

When a time set to the timer for log storage process elapses and the first timer unit 46 instructs the log storing unit 51 to execute the log storage process, the log storing unit 51 performs the processes subsequent to the log storage process of step S110 in order. Similarly, when the main controller 32 detects power off of the data storage device 1 and instructs the log storing unit 51 to execute the log storage process, the log storing unit 51 performs the processes subsequent to the log storage process of step S110 in order.

Figure 8:
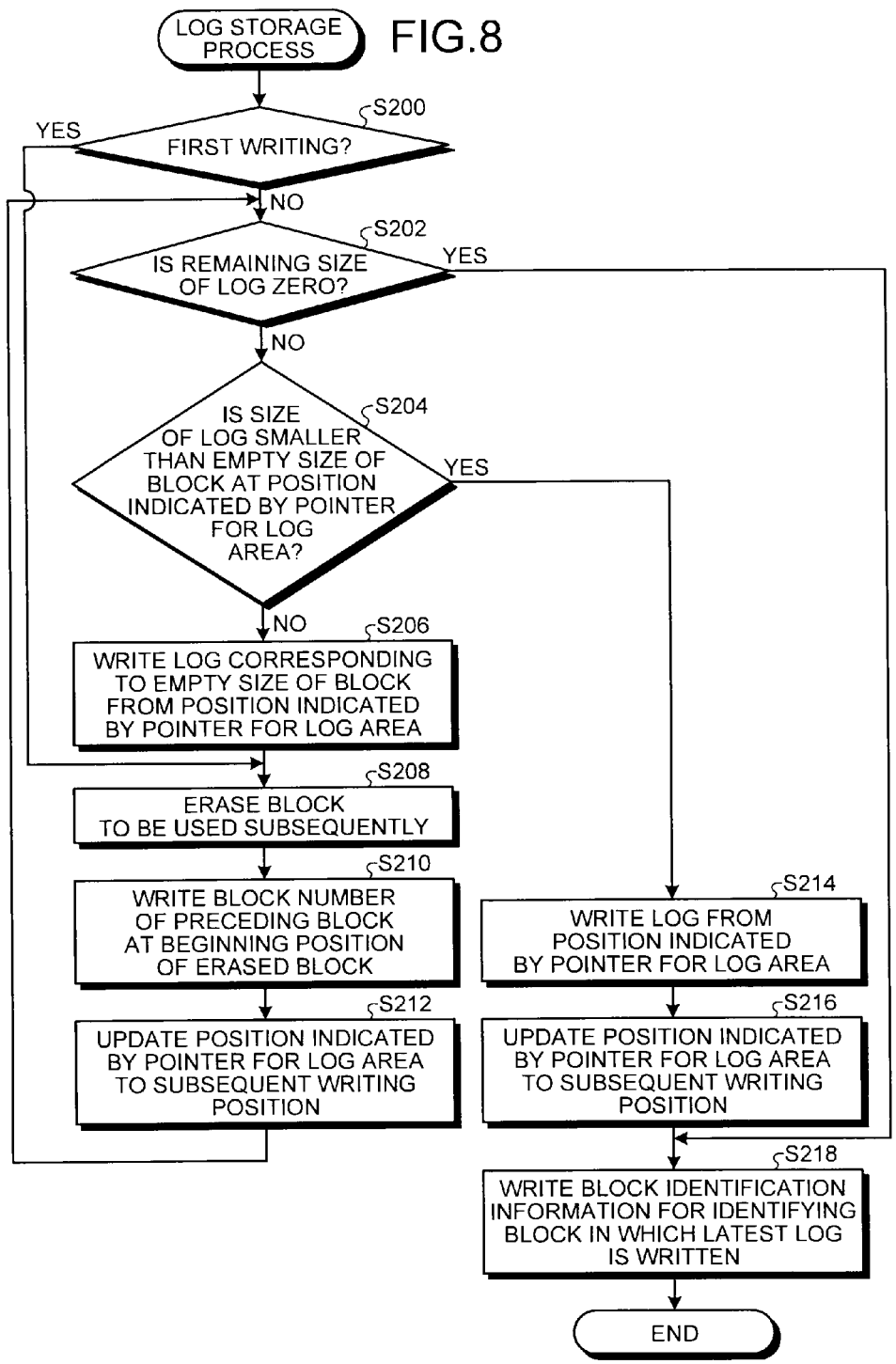
FIG. 8 is a flowchart illustrating a log storage process in the embodiment.

FIG. 8 is a flowchart illustrating an example of the flow of the log storage process procedure illustrated in step S110 of FIG. 7.

First, the log storing unit 51 determines whether or not log writing to the flash memory 11 is the first time (step S200). For example, when the pointer for the log area of the flash memory 11 indicates a certain position on the log area, the log storing unit 51 determines that it is not the first-time log writing, whereas when the pointer for the log area does not indicate a position on the log area, the log storing unit 51 determines that it is the first-time log writing.

When it is not the first-time log writing (No in step S200), the log storing unit 51 determines whether or not the remaining size of a log to be written in the flash memory 11 is zero (step S202).

When the remaining size of the log is not zero (No in step S202), the log storing unit 51 determines whether or not the remaining size of the log is smaller than the empty size of a block at a position indicated by the pointer for the log area (step S204). In the NAND type flash memory such as the flash memory 11, when data is written in a new block, an erase process of the block is necessary. Therefore, in the embodiment, it is determined whether or not the remaining size of the log is smaller than the empty size of the block at the position indicated by the pointer for the log area to thereby determine whether or not the erase process of the new block is necessary.

Subsequently, when the remaining size of the log is larger than the empty size of the block at the position indicated by the pointer for the log area (No in step S204), the log storing unit 51 writes the log corresponding to the empty size of the block from the position indicated by the pointer for the log area (step S206).

Subsequently, the log storing unit 51 erases a block which is to be used next (step S208). Therefore, log writing to the erased block can be performed.

Subsequently, the log storing unit 51 writes a block number of a preceding block at a beginning position of the erased block, that is, a block number of the block in which the log is written in step S206 (step S210). The block number is used for restoring the management information.

Subsequently, the log storing unit 51 updates a position indicated by the pointer for the log area to a next writing position (step S212) and returns to step S202. Since the size of the block number is generally smaller than the size of the page, the log storing unit 51 updates a position indicated by the pointer for the log area to a position representing a page next to a page in which the block number is written.

When it is determined in step S200 that it is the first-time log writing (Yes in step S200), the log storing unit 51 proceeds to step S208 and erases a block to be used next (a block to be used for the first time). In this case, in step S210, the log storing unit 51 writes a block number of an invalid block at a beginning position of the erased block. Therefore, it is possible to discriminate a block in which a first log is stored. If it is possible to discriminate a block in which a first log is stored, any information can be used as information to be written at the beginning position of the erased block.

When it is determined in step S202 that the remaining size of the log is zero (Yes in step S202), the log writing to the flash memory 11 has been completed. The log storing unit 51 stores block identification information for identifying a block in which the latest log is stored in the flash memory 11 (step S218) and finishes the log storage process.

When it is determined in step S204 that the remaining size of the log is smaller than the empty size of the block at the position indicated by the pointer for the log area (Yes in step S204), the log storing unit 51 writes the log from the position indicated by the pointer for the log area (step S214). The log storing unit 51 moves the position indicated by the pointer for the log area by the size of the log written in the log area and updates the position as the next writing position (step S216). The log storing unit 51 stores block identification information for identifying a block in which the latest log is stored in the flash memory 11 (step S218) and finishes the log storage process.

As described above, in the embodiment, when storing the log in the log area of the flash memory 11, a block number of a block which is to be used next is not written in a block in which a log is written. Instead, a block number of a block in which a log is written previously is written in an erased block which is to be used next. Therefore, it is easy to cope with the situation where a failure to erase a block which is to be used next occurs.

In the NAND type flash memory such as the flash memory 11, a block which fails to be erased is generally set as a bad block. Therefore, when the erase process fails, a different block is erased and used.

A block number of a block which is to be used next is written in a block in which a log is written before erasing the block which is to be used next. In this case, when the erase process fails, a block number of a block which fails to be erased is registered in the block in which the log is written.

Since the NAND type flash memory requires the erase process of a block in which data is written in order to rewrite already written data, it is not easy to rewrite only a block number of a block which is to be used next.

In the embodiment, even when a block which is to be used next fails to be erased, a different block can be erased and a block number of a block in which a log is written previously can be written in the erased different block. Therefore, the above-described problem does not occur, and it is easy to cope with the situation where a failure of the erase process occurs.

Furthermore, when writing a block number of a block which is to be used next in a block in which a log is written, the block number of the block which is to be used next is generally written at the end of the block in which the log is written. A writable area is not left in the block in which the log is written if the block number fails to be written. Thus, the block number of the block which is to be used next cannot be written in the block in which the log is written. In this case, the block number of the block which is to be used next has to be written in a new block together with the log already written in the block in which the log is written. In the block in which the block number of the block in which the log is written is written, it is necessary to rewrite this block number into a block number of a new block, but it is not easy as described above.

In the embodiment, a block number of a block in which a log is written previously is written at the beginning of a block which is successfully erased. Thus, even when the block number fails to be written, the block number of the block in which the log is written previously can be written at the beginning of a different block which is successfully erased. Particularly, since a block number is written at the beginning of a different block which is successfully erased, a time taken to recover from an error can be reduced.

Next, a specific example of the log storing operation performed by the data storage device according to the embodiment is described.

Figure 9:
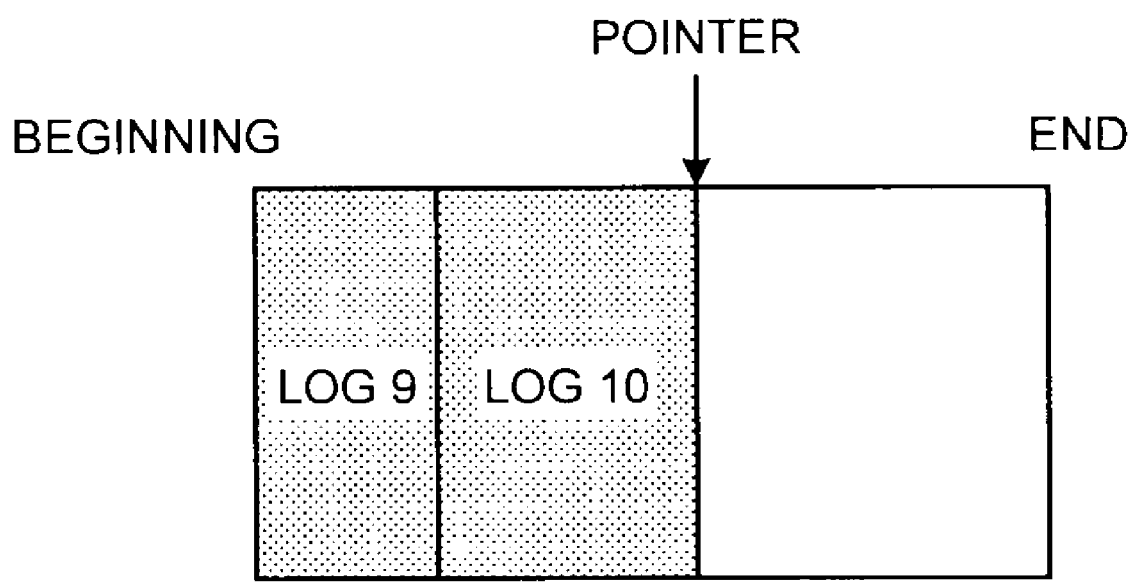
FIG. 9 is a schematic view illustrating a state of a writing buffer in the embodiment.

FIG. 9 is a schematic view illustrating an example of the state of a writing buffer 42. In the writing buffer 42 illustrated in FIG. 9, logs 9 and 10 are written in order from a beginning position. The logs 9 and 10 are logs which do not need to be immediately stored in the flash memory 11. The pointer for the writing buffer 42 indicates a next writing position.

Figure 10:
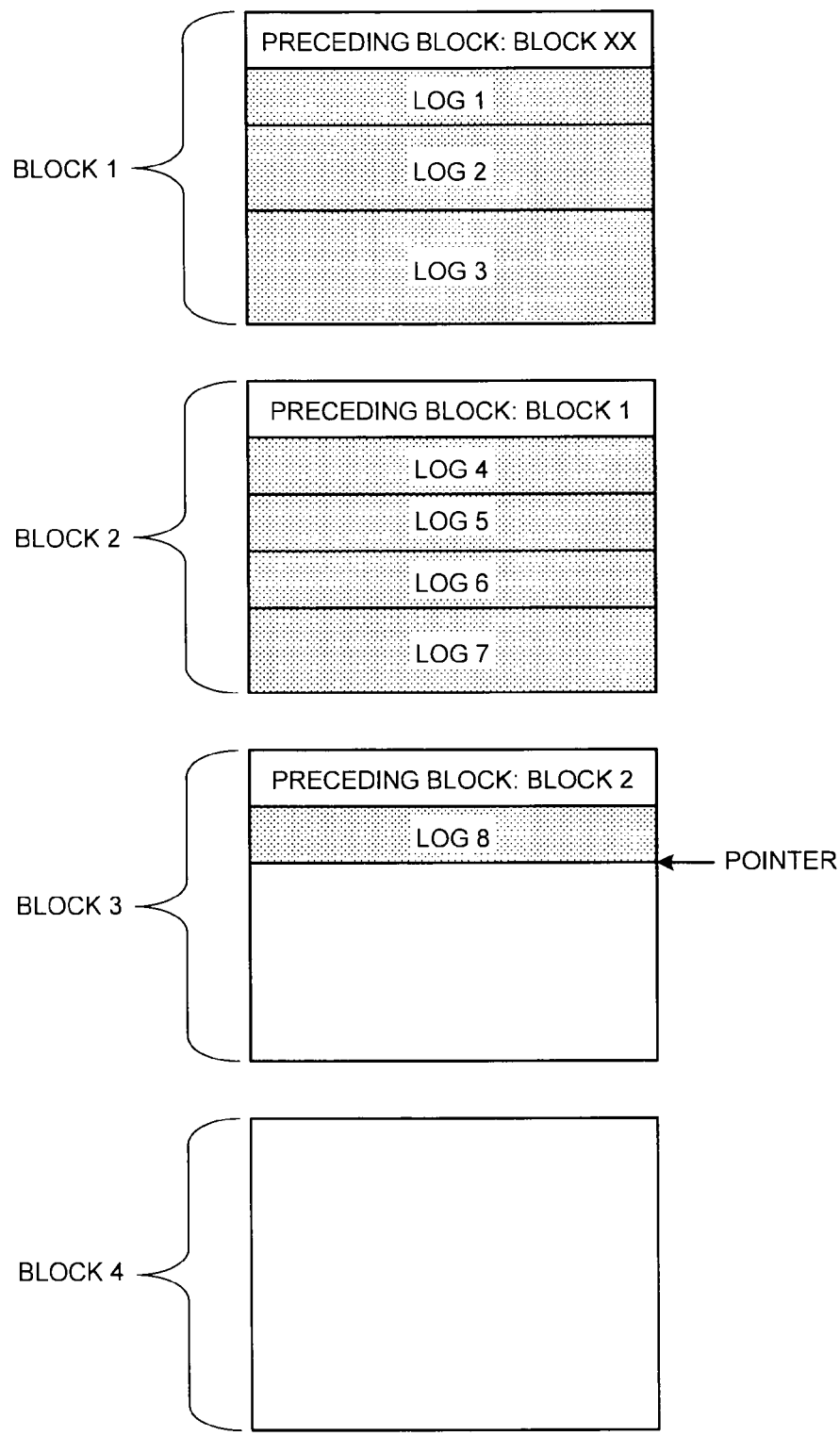
FIG. 10 is a schematic view illustrating a state of a log area in the embodiment.

FIG. 10 is a schematic view illustrating an example of the state of a log area of the flash memory 11. In the example illustrated in FIG. 10, logs 1 to 3 are written in a block 1, logs 4 to 7 are written in a block 2, and a log 8 is written in a block 3. A block 4 is not used yet. A block XX, a block 1, and a bock 2 are written in the blocks 1 to 3, respectively, as block numbers of preceding blocks. The block XX is a block number of an invalid block. Therefore, it can be discriminated that the log 1 stored in the block 1 is the first log. The pointer for the log area indicates a new writing position.

Next, the log storing operation when the log storing request is transmitted from the main controller 32 in the state illustrated in FIGS. 9 and 10 is described with reference to the flowcharts of FIGS. 7 and 8.

First, the log storing unit 51 receives the log storing request from the main controller 32, and the first timer unit 46 stops the timer for log storage process (step S100 and step S102 of FIG. 7). Here, it is assumed that discrimination information included in the log storing request represents that it has to be immediately stored in the flash memory 11.

Figure 11:
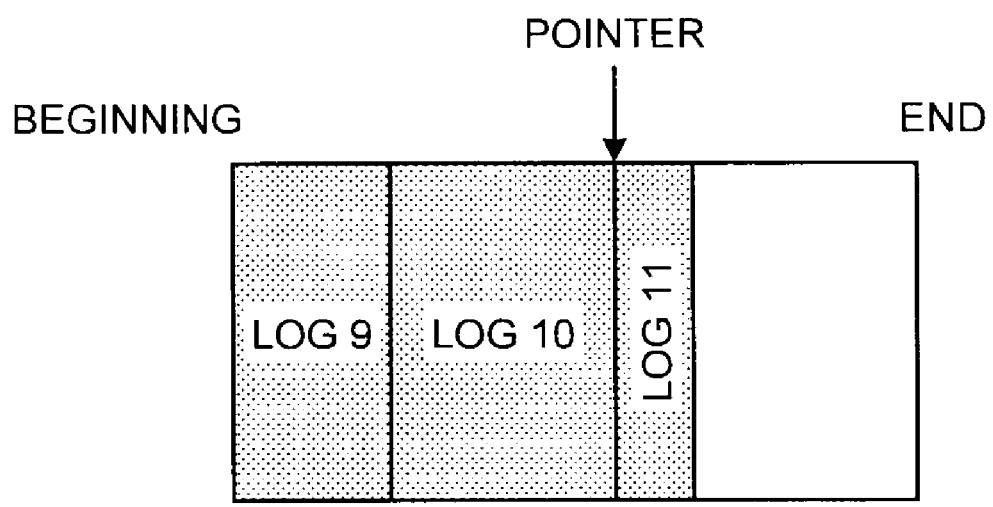
FIG. 11 is a schematic view illustrating a state of the writing buffer in the embodiment.

Subsequently, the log storing unit 51 extracts a log from the log storing request, processes the extracted log, and writes the processed log 11 from a position indicated by the pointer for the writing buffer 42 (step S104 of FIG. 7). The state of the writing buffer 42 after writing the log 11 is illustrated in FIG. 11.

Subsequently, the log storing unit 51 determines that the log 11 written in the writing buffer 42 is a log which has to be immediately stored in the flash memory 11 and performs the log storage process of storing the logs 9 to 11 written in the writing buffer 42 in the log area of the flash memory 11 (Yes in step S106, and step S110 of FIG. 7).

Subsequently, since the pointer for the log area of the flash memory 11 indicates a position on the log area as illustrated in FIG. 10, the log storing unit 51 determines that it is not first-time log writing (No in step S200 of FIG. 8).

Subsequently, since the logs 9 to 11 are not written in the log area of the flash memory 11 yet as illustrated in FIG. 10, the log storing unit 51 determines that the remaining size of the log is not zero (No in step S202 of FIG. 8).

Subsequently, the log storing unit 51 determines whether or not a sum of sizes of the logs 9 to 11 is smaller than the empty size of the block 3 (see FIG. 10) at a position indicated by the pointer for the log area (step S204 of FIG. 8). Here, it is assumed that a sum of the sizes of the logs 9 to 11 is larger than the empty size of the block 3 illustrated in FIG. 10. The log storing unit 51 determines that a sum of the sizes of the logs 9 to 11 is larger than the empty size of the block 3 at a position indicated by the pointer for the log area (No in step S204 of FIG. 8).

Subsequently, the log storing unit 51 writes the log corresponding to the empty size of the block 3 from the position indicated by the pointer for the log area illustrated in FIG. 10 (step S206 of FIG. 8). Here, it is assumed that the log storing unit 51 writes the log 9 and a part of the log 10.

Subsequently, the log storing unit 51 determines that the block 4 illustrated in FIG. 10 is a block which is to be used next, erases the block 4, and writes a block number of the block 3 at a beginning position of the block 4 (step S208 and step S210 of FIG. 8).

Subsequently, the log storing unit 51 updates the position indicated by the pointer for the log area to a position indicating a page next to a page on which the block number of the block 3 is written (step S212 of FIG. 8) and returns to step S202 of FIG. 8.

Subsequently, since the remainder of the log 10 and the log 11 are not written in the log area of the flash memory 11 yet, the log storing unit 51 determines that the remaining size of the log is not zero (No in step S202 of FIG. 8).

Subsequently, the log storing unit 51 determines whether or not a sum of sizes of the remainder of the log 10 and the log 11 is smaller than the empty size of the block 4 (see FIG. 10) at a position indicated by the pointer for the log area (step S204 of FIG. 8). Here, it is assumed that a sum of the sizes of the remainder of the log 10 and the log 11 is smaller than the empty size of the block 4. The log storing unit 51 determines that a sum of the sizes of the remainder of the log 10 and the log 11 is smaller than the empty size of the block 4 at a position indicated by the pointer for the log area (Yes in step S204 of FIG. 8).

Figure 12:
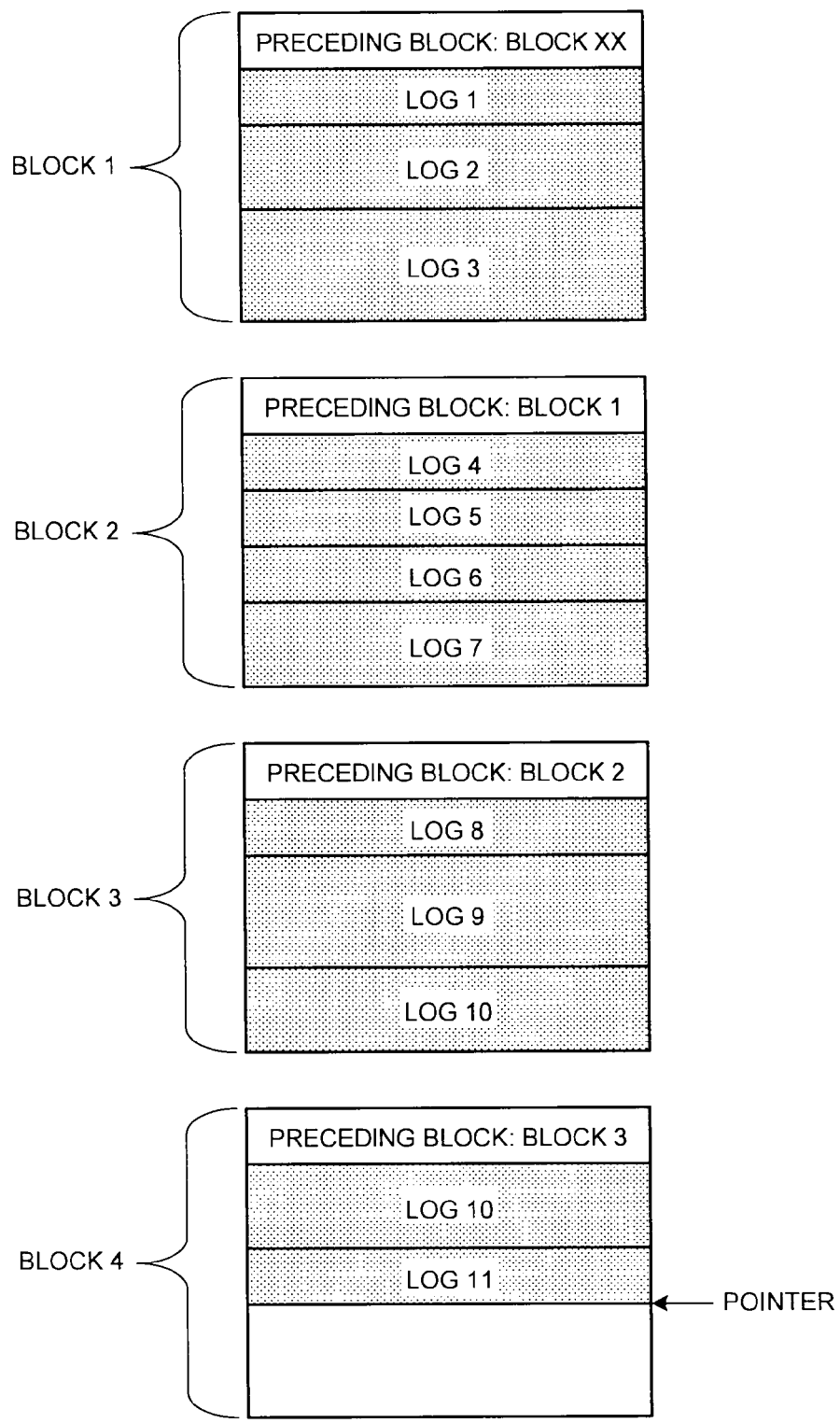
FIG. 12 is a schematic view illustrating a state of the log area in the embodiment.

Subsequently, the log storing unit 51 writes the remainder of the log 10 and the log 11 from the position indicated by the pointer for the log area, moves the position indicated by the pointer for the log area by the sum of the sizes of the remainder of the log 10 and the log 11 to update the position to a next writing position (step S214 and step S216 of FIG. 8), and finishes the log storage process. FIG. 12 is a schematic view illustrating an example the state of a log area after finishing the log storage process.

Subsequently, when the log storage process is finished, the log storing unit 51 clears the logs 9 to 11 written in the writing buffer 42 and moves the position indicated by the pointer for the writing buffer 42 back to the beginning position of the writing buffer 42 (step S112 and step S114 of FIG. 7).

Figure 13:
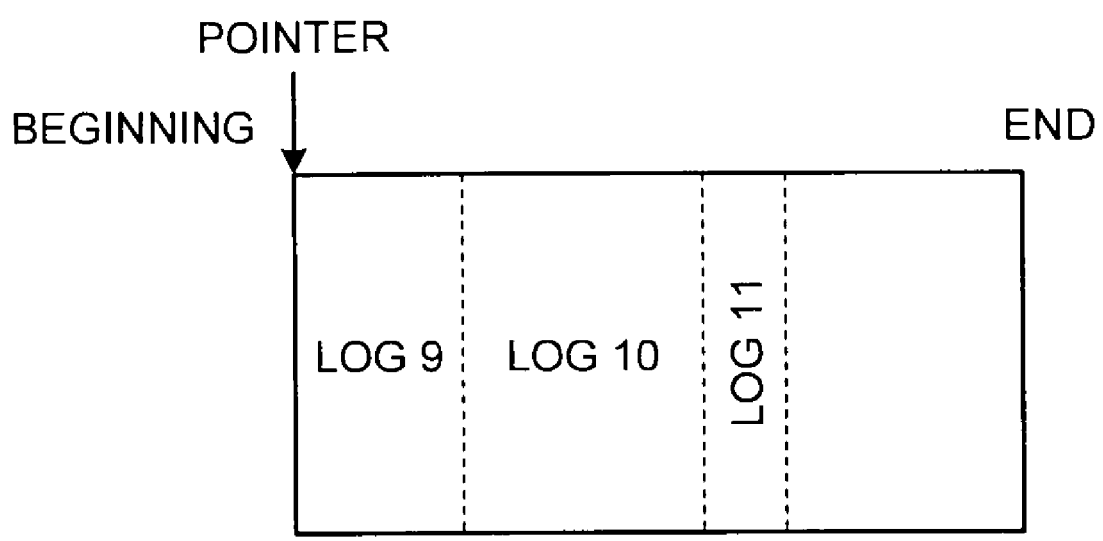
FIG. 13 is a schematic view illustrating a state of a writing buffer in the embodiment.

FIG. 13 is a schematic view illustrating an example of a state of the writing buffer 42 after initialization. The logs 9 to 11 indicated by a dotted line represent that they were cleared. The pointer for the writing buffer 42 indicates the beginning position of the writing buffer 42 as a next writing position.

Subsequently, the log storing unit 51 determines whether or not the empty size of the log area of the flash memory 11 is smaller than the second threshold value (step S116 of FIG. 7). Here, it is assumed that the empty size of the log area of the flash memory 11 is larger than the second threshold value, that is, the size of the writing buffer 42. The log storing unit 51 determines that the empty size of the log area of the flash memory 11 is larger than the second threshold value (No in step S116 of FIG. 7).

Subsequently, the first timer unit 46 receives an instruction from the log storing unit 51, resets a time of the timer for log storage process again, and starts the timer for log storage process (step S120 of FIG. 7).

In the embodiment, through the above-described process, a log representing an update content of the management information is stored in the flash memory 11. Particularly, in the embodiment, since the log is stored in the flash memory 11 in order of the log 9, the log 10, and the log 11 in which the log storing request is performed, the management information can be restored in a state in which consistency is properly obtained at the time of restoring the management information.

Next, the management information storage process performed by the data storage device according to the embodiment is described.

Figure 14:
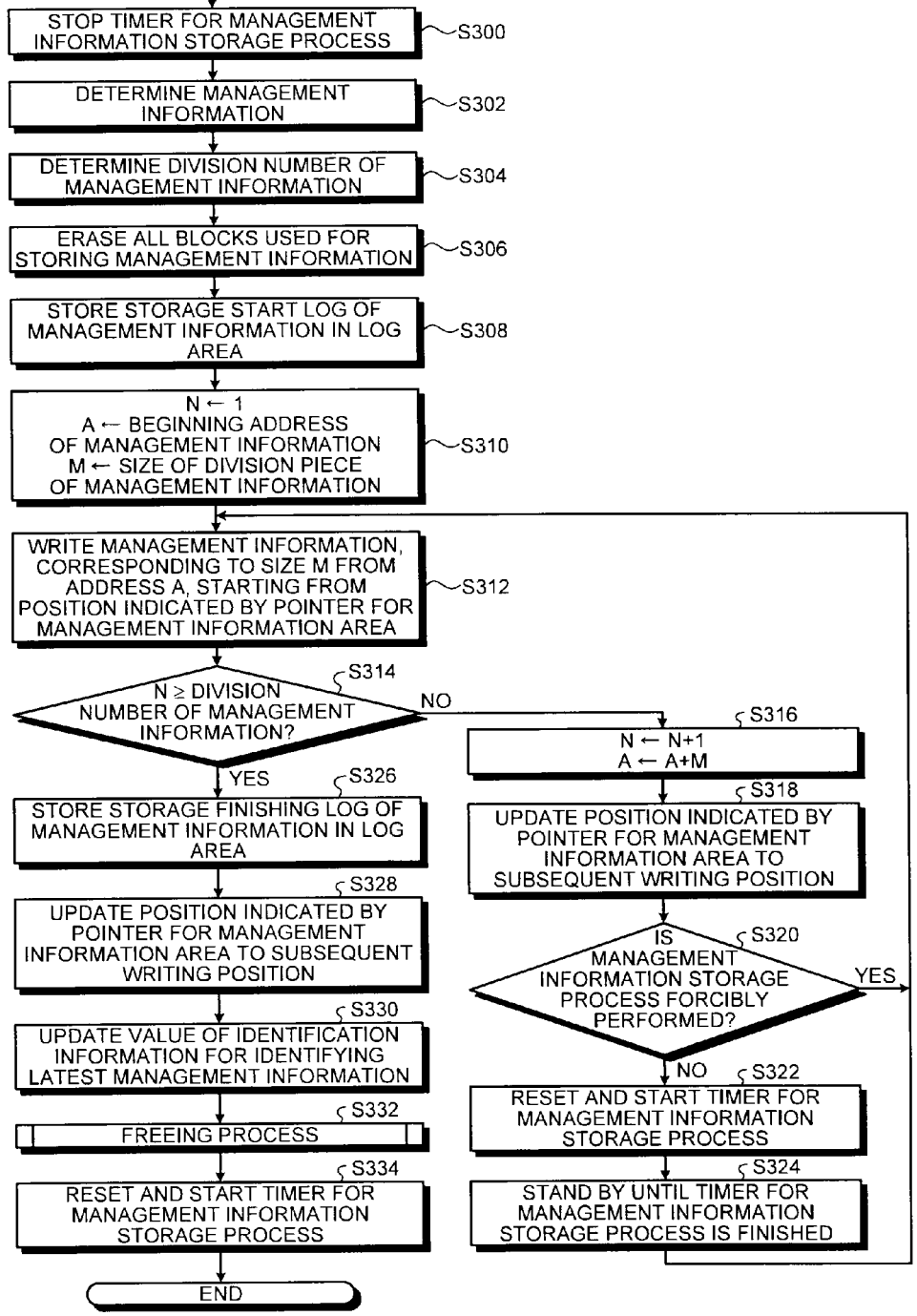
FIG. 14 is a flowchart illustrating a management information storage process in the embodiment.

FIG. 14 is a flowchart illustrating an example of the flow of a management information storage process procedure performed by the data storage device 1 according to the embodiment. The management information storage process is performed when the main controller 32 requests storing of management information, when a time set to the timer for management information storage process elapses and the second timer unit 48 instructs the management information storage process, and when the log storing unit 51 determines that the empty size of the log area of the flash memory 11 is smaller than the second threshold value during the log storing operation (Yes in step S116, and step S118 of FIG. 7).

First, the second timer unit 48 receives an instruction from the management information storing unit 53 and stops the timer for management information storage process (step S300).

Subsequently, the management information storing unit 53 determines the management information (step S302). Specifically, the management information storing unit 53 determines the management information based on a beginning position and a size of the management information on the management memory 30. When the beginning position and the size of the management information on the management memory 30 are included in the management information storing request from the main controller 32, the management information storing unit 53 determines the management information using the information.

Subsequently, the management information storing unit 53 determines a division number of the management information (step S304). Specifically, the management information storing unit 53 determines the division number of the management information by determining a size of a division piece of the management information and dividing the size of the management information by the size of the division piece. The management information storing unit 53 determines the size of the division piece of the management information to a value of an integer multiple of a block size of the flash memory 11 in order to efficiently store the management information in the flash memory 11.

Subsequently, the management information storing unit 53 erases all blocks used to store the management information (step S306). When erasing of blocks fails, the management information storing unit 53 prepares and erases an alternative block. At this time, the log storing unit 51 creates a log of the alternative block if necessary. That is, the management information storing unit 53 prepares as many erased blocks as necessary for storing the management information before storing the management information in the flash memory 11. However, since an error may occur when writing the management information in the block and so the block becomes the bad block, the management information storing unit 53 preferably prepares and erases more blocks than blocks used for storing the management information.

Subsequently, the log storing unit 51 creates a storage start log representing that storing of the management information starts and stores the created storage start log in the log area of the flash memory 11 (step S308). The storage start log is a log which includes a log type representing the storage start log and a management information identifier representing the management information which the storage start log belongs to. Because the management information storing unit 53 can start storing the management information only after the storage start log is written in the log area of the flash memory 11, the log storing unit 51 immediately writes the storage start log in the log area of the flash memory 11. That is, the storage start log is treated as a log which has to be immediately stored in the flash memory 11, and the log storing unit 51 performs the processes subsequent to the log storage process of step S110 in order.

Subsequently, when it is confirmed that the log storing unit 51 has stored the storage start log in the log area of the flash memory 11, the management information storing unit 53 sets a counter N for counting the division piece of the management information to one, sets an address A representing a position on the management memory 30 to a beginning position of the management information, and sets a variable M representing a size of the division piece of the management information to a size of the division piece (step S310).

Subsequently, the management information storing unit 53 writes the management information corresponding to the size M from the address A on the management memory 30, that is, the division piece of the management information, from a position indicated by the pointer for the management information area of the flash memory 11 (step S312). When an empty size of a block at a position indicated by the pointer for the management information area is small, a block erased in step S306 may be obtained, the position indicated by the pointer for the management information area may be updated to a beginning position of the obtained block, and the division piece of the management information may be written. In the NAND type flash memory such as the flash memory 11, when data is written from the middle of a block, writing is performed in units of pages. However, when data is written from the beginning of a block, writing is performed in units of blocks, and thus a writing time can be reduced.

Subsequently, when it is confirmed that writing of the division piece in the management information area is finished, the management information storing unit 53 determines whether or not a value of the counter N is equal to or more than the division number of the management information and checks whether or not writing of all division pieces is finished (step S314).

When the value of the counter N is less than the division number of the management information and the division piece which is not written yet remains (No in step S314), the counter N is incremented, and the address A moves by the size M of the division piece (step S316).

Subsequently, the management information storing unit 53 moves the position indicated by the pointer for the management information area by the size M and updates the position to a next writing position (step S318). When there is no empty size in the block after writing the division piece in step S312, a block erased in step S306 is obtained, and the position indicated by the pointer for the management information area is updated to a beginning position of the obtained block.

Subsequently, the management information storing unit 53 checks whether or not the management information storage process is forcibly performed (step S320). For example, when the log storing unit 51 determines that the empty size of the log area of the flash memory 11 is smaller than the second threshold value during the log storing operation (Yes in step S116, and step S118 of FIG. 7), the management information storage process is forcibly performed.

When the management information storage process is not forcibly performed (No in step S320), the second timer unit 48 receives an instruction from the management information storing unit 53, resets a time of the timer for management information storage process, and starts the timer for management information storage process (step S322). The management information storing unit 53 indicates a time to be reset to the timer for management information storage process to the second timer unit 48 in consideration of a time necessary for storing the management information, a frequency in which the host device 2 accesses the data storage device 1 while storing the management information, and a size of the log area. A time to be reset to the timer for management information storage process can be preferably set whenever storing the division piece of the management information or whenever storing the management information.

Subsequently, the management information storing unit 53 stands ready until a time set to the timer for management information storage process elapses and the second timer unit 48 instructs the management information storing unit 53 to restart management information storage process (step S324) and returns to step S312.

When it is determined in step S320 that the management information storage process is forcibly performed (Yes in step S320), the processes of steps S322 to S324 are not performed, and it returns to step S312.

When it is determined in step S314 that the value of the counter N is equal to or more than the division number of the management information and writing of all of the division pieces is finished (Yes in step S314), the log storing unit 51 creates a storage finishing log which represents that it is finished to store the management information and a position of each of plural division pieces on the management information storing area and stores the created storage finishing log in the log area of the flash memory 11 (step S326).

FIG. 15 is a view illustrating an example of the storage finishing log. As illustrated in FIG. 15, the storage finishing log is a log which includes a log type representing the storage finishing log, a management information identifier representing the management information which the storage finishing log belongs to, the division number of the management information, the size of each division piece of the management information, and a position on the management information area of the flash memory 11 in which each division piece is stored. The management information identifier is identical to that of the storage start log. Because the management information storing unit 53 can finish storing the management information only after writing the storage finishing log in the log area of the flash memory 11, the log storing unit 51 immediately writes the storage finishing log in the log area of the flash memory 11. That is, the storage finishing log is treated as a log which has to be immediately stored in the flash memory 11, and the log storing unit 51 performs the processes subsequent to the log storage process of step S110 in order.

Subsequently, returning back to FIG. 14, when it is confirmed that the log storing unit 51 stored the storage finishing log in the log area of the flash memory 11, the management information storing unit 53 moves the position indicated by the pointer for the management information area by the size M and updates to a next writing position (step S328). When a block erased in step S306 remains, the erased block may be obtained, and the position indicated by the pointer for the management information area may be updated to a beginning position of the obtained block.

Subsequently, the management information storing unit 53 updates a value of identification information for identifying the latest management information to a value of the management information identifier included in the storage finishing log (step S330). Therefore, it is possible to obtain the latest management information with reference to the identification information at any time.

Subsequently, the management information storing unit 53 performs a freeing process for freeing the management information and the log, which become unnecessary by the above-described management information storage process, from the management information area and the log area and making them become a reusable state (step S332). The details of the freeing process will be described later.

Subsequently, the second timer unit 48 receives an instruction from the management information storing unit 53, resets a time of the timer for management information storage process, and starts the timer for management information storage process (step S334). A time to be reset to the timer for management information storage process can be preferably set whenever storing the management information or as needed.

As described above, in the embodiment, the management information storing unit 53 stands ready to store a division piece for a predetermined time each time the management information storing unit 53 completes storing each division piece of the management information. Therefore, the main controller 32 can process a command received from the host device 2 between storing the division pieces.

When the management information storage process is forcibly performed, because the empty size of the log area is small, the management information storing unit 53 stores all of the division pieces without standing ready. Therefore, it is possible to prevent a phenomenon that the log cannot be stored because the empty size of the log area is insufficient and to free the unnecessary log of the log area early.

Figure 16:
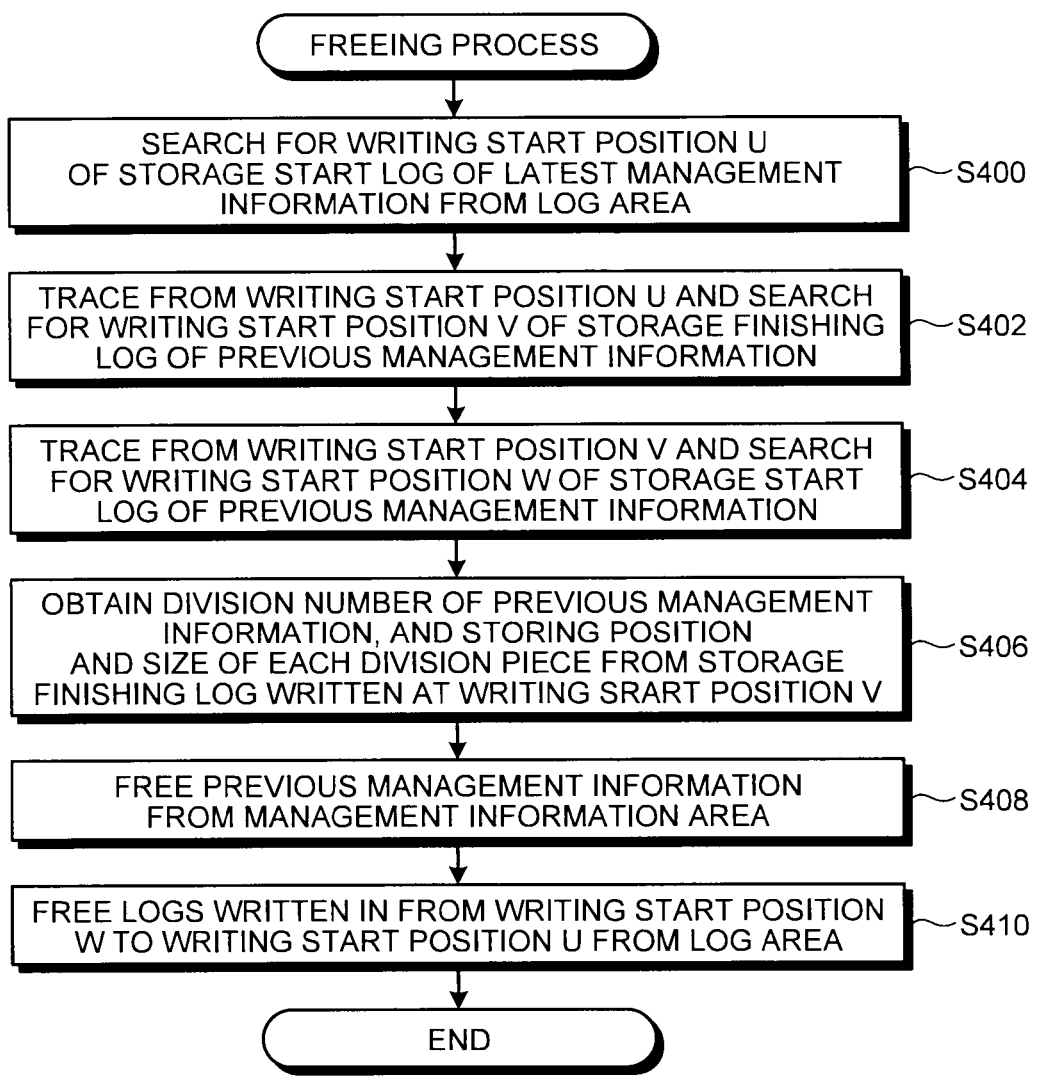
FIG. 16 is a flowchart illustrating a freeing process in the embodiment.

FIG. 16 is a flowchart illustrating an example of the flow of a freeing process procedure illustrated in step S332 of FIG. 14.

First, the log storing unit 51 searches for a writing start position U of the storage start log of the latest management information from the log area of the flash memory 11 (step S400). Since the writing start position U is the position of the log area in which the storage start log is written in step S308 of FIG. 14, the writing start position U may be stored in advance.

Subsequently, the log storing unit 51 traces from the writing start position U and searches for a writing start position V of the storage finishing log of the previous management information (step S402). Specifically, the log storing unit 51 searches for the writing start position V by searching for the management information identifier of the storage finishing log of the previous management information. For example, when a monotone increasing integer is used in the management information identifier, it is necessary to search for the management information identifier having a value obtained by decrementing a value of the identification information for identifying the latest management information. Since a block number of a preceding block is written in a block used in the log area, the log storing unit 51 can trace old blocks by using the block number in order.

Subsequently, the log storing unit 51 traces from the writing start position V and searches for a writing start position W of the storage start log of the previous management information (step S404). Specifically, the log storing unit 51 searches for the writing start position W by searching for the management information identifier of the storage start log of the previous management information. For example, when a monotone increasing integer is used in the management information identifier, it is necessary to search for the management information identifier having a value obtained by decrementing a value of the identification information for identifying the latest management information.

Subsequently, the log storing unit 51 obtains, from the storage finishing log of the previous management information written at the writing start position V, the division number of the previous management information, the size of each division piece of the previous management information, and a position on the management information area at which each division piece is stored (step S406).

Subsequently, the management information storing unit 53 frees the previous management information from the management information area with reference to the division number of the previous management information, the size of each division piece of the previous management information, and the position on the management information area at which each division piece is stored which are obtained by the log storing unit 51 (step S408). As a result, it is possible to change an area in which the previous management information has been written to a reusable state. When the size of the division piece of the previous management information is an integer multiple of the block size, the management information area can be reused in units of blocks, thereby increasing the efficiency.

Subsequently, the log storing unit 51 frees the logs written from the writing start position W to the writing start position U from the log area (step S410). Therefore, an area from the writing start position W to the writing start position U can be changed to a reusable state. When the size of the log area to be freed is an integer multiple of the block size, the management information area can be reused in units of blocks, thereby increasing the efficiency.

Next, a specific example of the management information storage process performed by the data storage device according to the embodiment is described.

Figure 17:
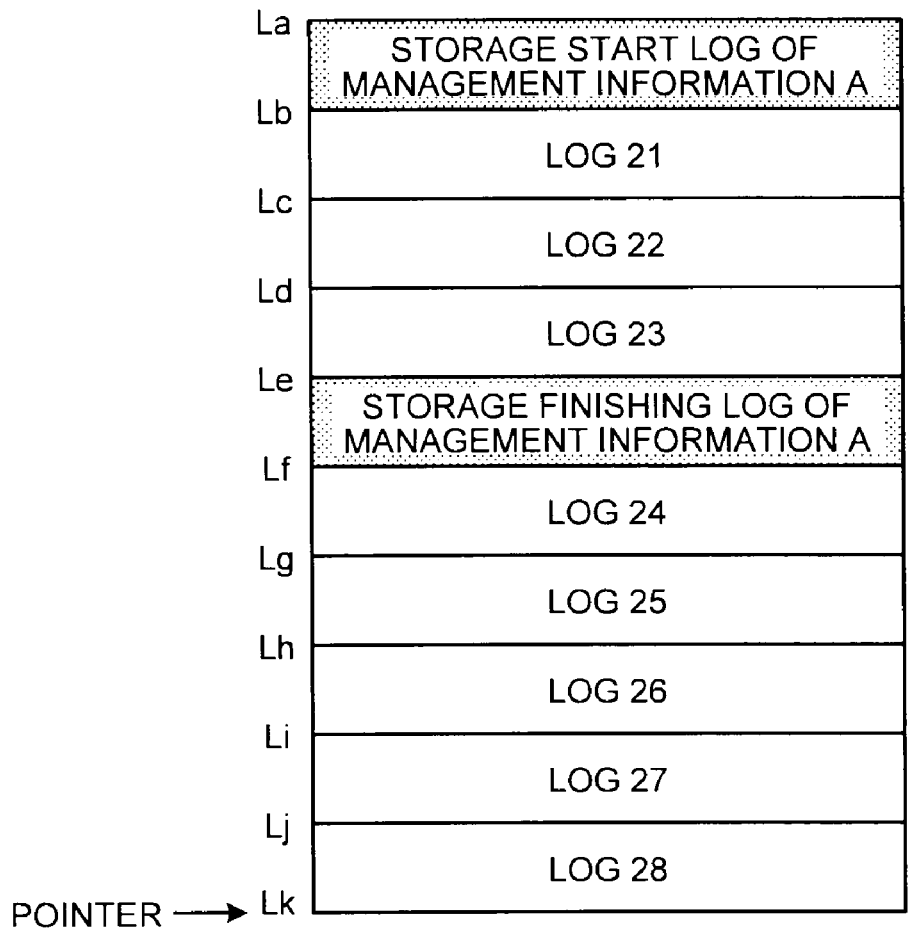
FIG. 17 is a schematic view illustrating a state of the log area in the embodiment.

FIG. 17 is a schematic view illustrating an example of the state of a log area of the flash memory 11. In the example illustrated in FIG. 17, a storage start log of management information A is written at a position La, logs 21 to 23 are written at positions Lb to Ld, respectively, a storage finishing log of the management information A is written at a position Le, and logs 24 to 28 are written at positions Lf to Lj, respectively. The pointer for the log area indicates a next writing position Lk. In the example illustrated in FIG. 17, in order to simplify a description, a unit such as a block or a page is omitted in representing the log area.

Figure 18:
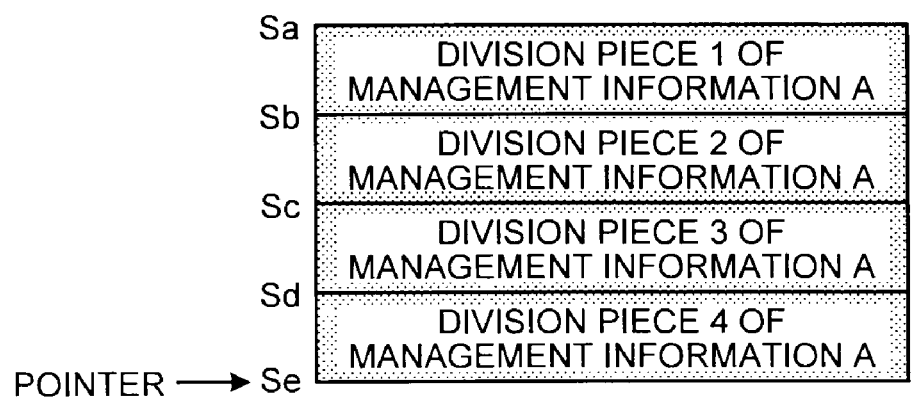
FIG. 18 is a schematic view illustrating a state of a management information area in the embodiment.

FIG. 18 is a schematic view illustrating an example of the state of a management information area of the flash memory 11. In the example illustrated in FIG. 18, division pieces 1 to 4 of the management information A are written at positions Sa to Sd. The pointer for the management information area indicates a next writing position Se. In the example illustrated in FIG. 18, in order to simplify a description, a unit such as a block or a page is omitted in representing the management information area.

Figure 19:
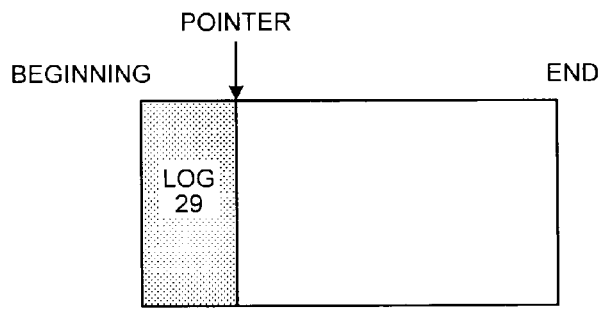
FIG. 19 is a schematic view illustrating a state of the writing buffer in the embodiment.

FIG. 19 is a schematic view illustrating an example of the state of a writing buffer 42. In the example illustrated in FIG. 19, a log 29 is written at a beginning position of the writing buffer 42. The log 29 is a log which does not need to be immediately stored in the flash memory 11. The pointer for the writing buffer 42 indicates a next writing position.

The management information storage process in the state illustrated in FIGS. 17 to 19 is described below with reference to the flowcharts of FIGS. 14 and 16.

First, the second timer unit 48 receives an instruction from the management information storing unit 53 and stops the timer for management information storage process, and the management information storing unit 53 determines the management information and the division number (steps S300 to S304 of FIG. 14). Here, it is assumed that the management information storing unit 53 divides management information B into four pieces.

Figure 20:
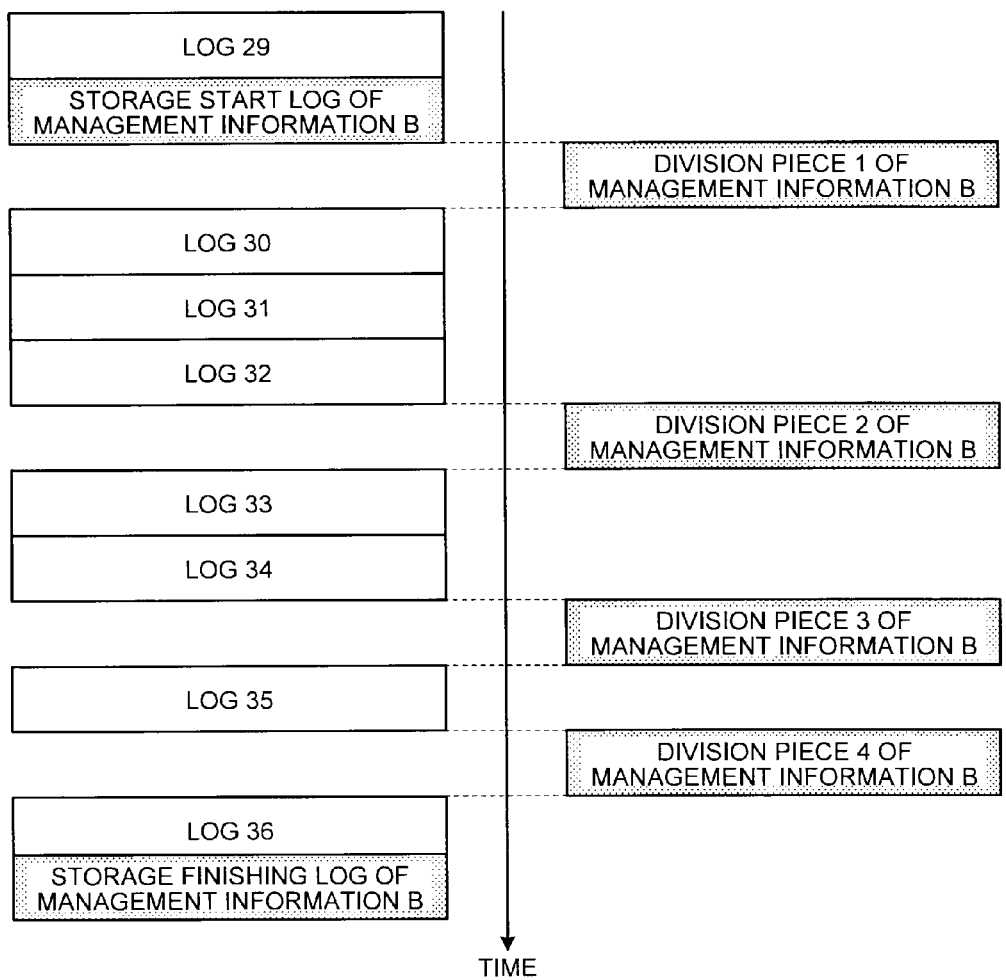
FIG. 20 is a view illustrating a time order of the management information storage process in the embodiment.

Subsequently, the management information storing unit 53 erases all blocks used for storing the management information B, and the log storing unit 51 creates a storage start log of the management information B and stores the created storage start log in the log area of the flash memory 11 (steps S306 and S308 of FIG. 14). The storage start log is a log which has to be immediately stored in the flash memory 11. Therefore, when the storage start log is written from the position indicated by the pointer for the writing buffer 42 illustrated in FIG. 19, the log storing unit 51 immediately stores the log 29 written in the writing buffer 42 and the storage start log of the management information B in the log area of the flash memory 11 as illustrated in FIG. 20. FIG. 20 is a view illustrating, in a time order, a procedure of storing the log and the management information in the management information storage process in the state illustrated in FIGS. 17 to 19.

Subsequently, when it is confirmed that the log storing unit 51 has stored the storage start log of the management information B in the log area of the flash memory 11, the management information storing unit 53 sets the counter N for counting the division piece of the management information B to one, sets the address A representing a position on the management memory 30 to a beginning position of the management information B, and sets the variable M representing a size of the division piece of the management information B to a size of the division piece (step S310 of FIG. 14).

Subsequently, the management information storing unit 53 writes the management information corresponding to the size M, that it, the division piece 1 of the management information B, from the address A on the management memory 30 and starting from the position Se indicated by the pointer for the management information area of the flash memory 11 illustrated in FIG. 18, as illustrated in FIG. 20 (step S312 of FIG. 14).

Subsequently, when it is confirmed that it is finished to write the division piece 1 of the management information B in the management information area, the management information storing unit 53 determines whether or not a value of the counter N is equal to or more than the division number of the management information B and checks whether or not it is finished to write all division pieces (step S314 of FIG. 14). Since the management information B is divided into four pieces in the current management information storage process, the management information storing unit 53 repeats the processes of steps S312 to S324 of FIG. 14 until the division piece is written in the management information area four times in step S312.

When the value of the counter N is less than the division number of the management information and the division piece which is not written yet remains, the management information storing unit 53 increments the counter N and moves the address A by the size M of the division piece (No in step S314, and step S316 of FIG. 14).

Subsequently, the management information storing unit 53 moves the position indicated by the pointer for the management information area by the size M and updates to a next writing position (step S318 of FIG. 14).

Subsequently, the management information storing unit 53 checks whether or not the management information storage process is forcibly performed (step S320 of FIG. 14). Here, it is assumed that the current management information storage process is not forcibly performed.

Subsequently, since the management information storage process is not forcibly performed, the second timer unit 48 receives an instruction from the management information storing unit 53, resets a time of the timer for management information storage process, and starts the timer for management information storage process (No in step S320, and step S322 of FIG. 14).

Subsequently, the management information storing unit 53 stands ready until a time set to the timer for management information storage process elapses and the second timer unit 48 instructs the management information storing unit 53 to restart the management information storage process (step S324 of FIG. 14) and returns to step S312. While the management information storing unit 53 is storing the management information B in the management information area, when the main controller 32 receives a command from the host device 2, the main controller 32 performs data processing with respect to the flash memory 11 in response to the command while the management information storing unit 53 stands ready, that is, is storing the division piece. The main controller 32 updates the management information on the management memory 30 in accordance with a content of data process and creates a log representing an update content of the management information. The log storing unit 51 stores the created log in the log area. Here, it is assumed that the log storing unit 51 stores logs 30 to 32 in the log area as illustrated in FIG. 20. The log is an update history of the management information. By storing a content of updating the management information performed while storing the management information, it is possible to properly restore the latest management information at the time of restoring the management information.

It is assumed that the management information storing unit 53 repeats the processes of step S312 four times, so that in step S314, the value of the counter N becomes equal to or more than the division number (4) of the management information, and it is finished to write all of the division pieces. Also, it is assumed that during this time, a division piece 2 of the management information B, logs 33 to 34, a division piece 3 of the management information B, a log 35, and a division piece 4 of the management information B are stored in the flash memory 11 in order as illustrated in FIG. 20.

When it is finished to write all of the division pieces, the log storing unit 51 creates the storage finishing log of the management information B and stores the created storage finishing log in the log area of the flash memory 11 (Yes in step S314, and step S326 of FIG. 14). The storage finishing log is a log which has to be immediately stored in the flash memory 11. Therefore, when the storage finishing log is written from the position indicated by the pointer for the writing buffer 42, the log storing unit 51 immediately stores a log 36 written in the writing buffer 42 and the storage finishing log of the management information B in the flash memory 11 as illustrated in FIG. 20.

Subsequently, when it is confirmed that the log storing unit 51 has stored the storage finishing log in the log area of the flash memory 11, the management information storing unit 53 moves the position indicated by the pointer for the management information area by the size M and updates to a next writing position (step S328 of FIG. 14).

Figure 21:
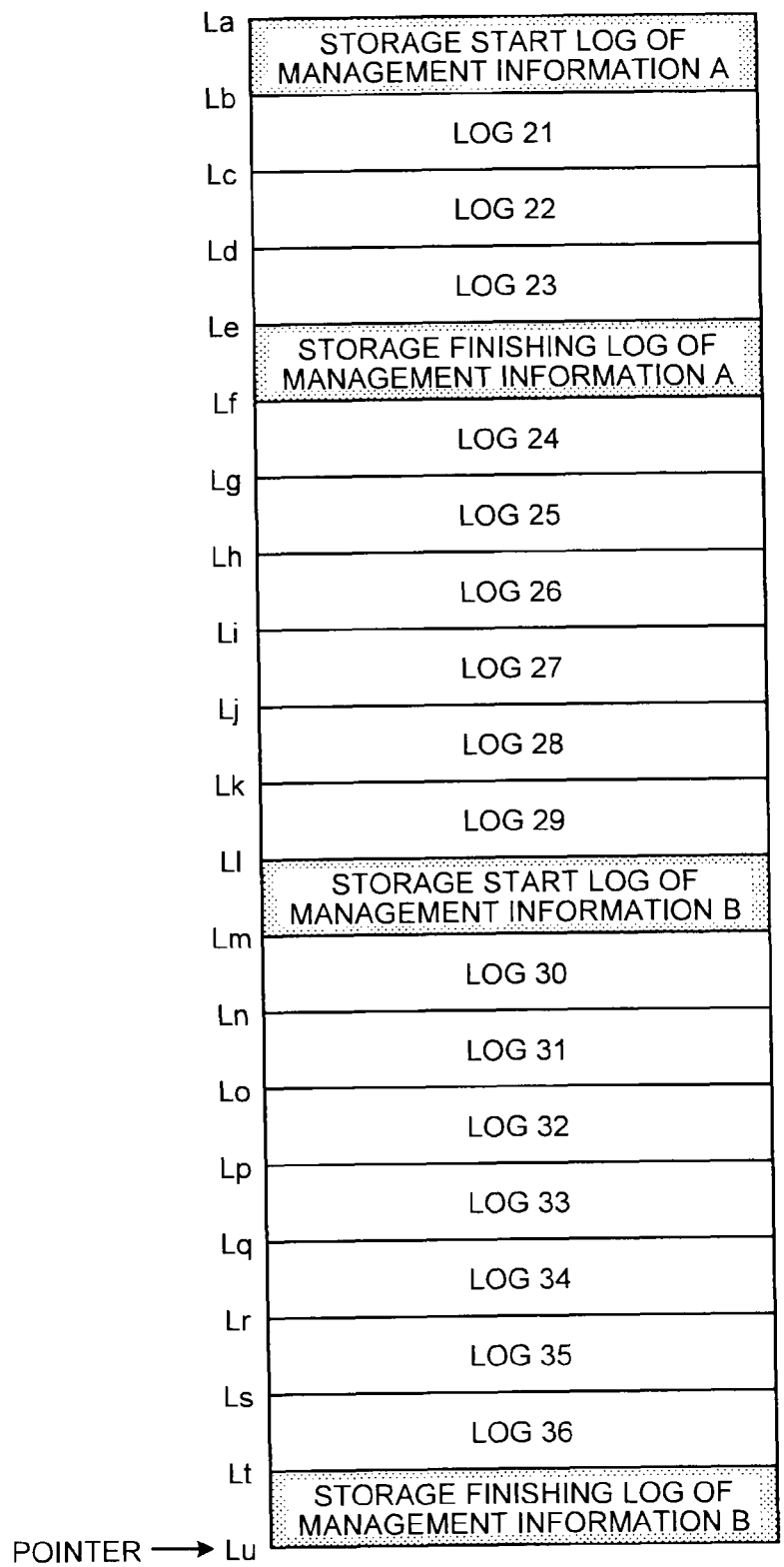
FIG. 21 is a schematic view illustrating a state of the log area in the embodiment.

FIG. 21 is a schematic view illustrating an example of the state of a log area after the storage finishing log of the management information B is stored. In the example illustrated in FIG. 21, the log 29 is written at a position Lk, the storage start log of the management information B is written at a position Ll, logs 30 to 36 are written at positions Lm to Ls, respectively, and the storage finishing log of the management information B is written at a position Lt. The pointer for the log area indicates a next writing position Lu.

Figures 22, 23:
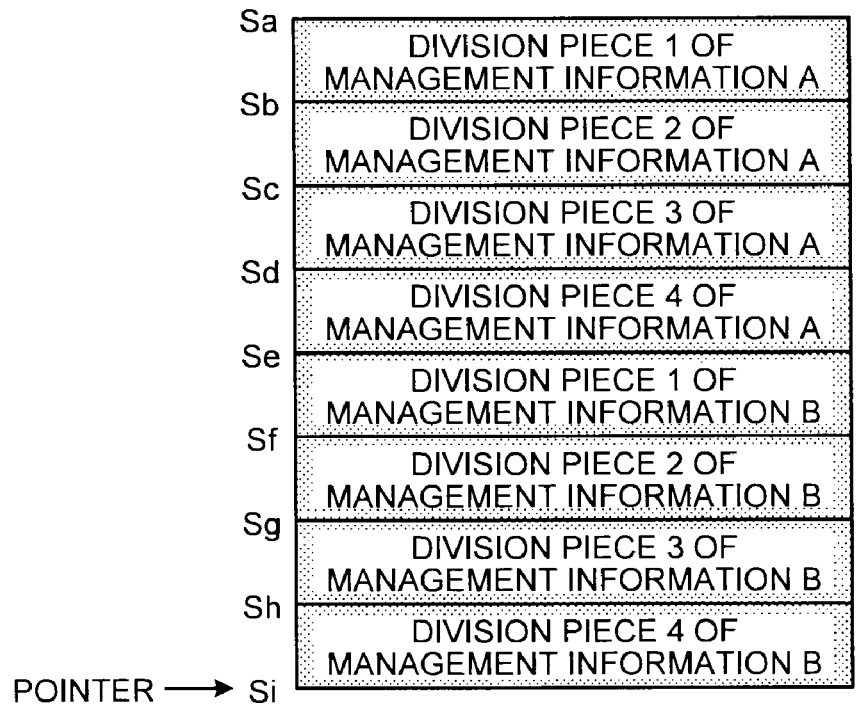
FIG. 22 is a schematic view illustrating a state of the management information area in the embodiment.
FIG. 23 is a view illustrating a storage finishing log of management information A.

FIG. 22 is a schematic view illustrating an example of the state of a management information area after the management information B is stored. In the example illustrated in FIG. 22, the division pieces 1 to 4 of the management information B are written at positions Se to Sh. The pointer for the management information area indicates a next writing position Si.

Subsequently, the management information storing unit 53 updates a value of identification information for identifying the latest management information to a value of the management information identifier of the management information B included in the storage finishing log (step S330 of FIG. 14).

Subsequently, the management information storing unit 53 performs the freeing process for freeing the management information A and the log, which become unnecessary by the current management information storage process, from the management information area and the log area and making them become a reusable state (step S332 of FIG. 14).

Subsequently, the log storing unit 51 searches for the writing start position U of the storage start log of the management information B as the latest management information from the log area of the flash memory 11 (step S400 of FIG. 16). In the example illustrated in FIG. 21, the writing start position U is the position Ll.

Subsequently, the log storing unit 51 traces from the writing start position U and searches for the writing start position V of the storage finishing log of the management information A as the previous management information (step S402 of FIG. 16). In the example illustrated in FIG. 21, the writing start position V is the position Le.

Subsequently, the log storing unit 51 traces from the writing start position V and searches for the writing start position W of the storage start log of the management information A as the previous management information (step S404 of FIG. 16). In the example illustrated in FIG. 21, the writing start position W is the position La.

Subsequently, the log storing unit 51 obtains the division number of the management information A, the size of each division piece of the management information A, and a position on the management information area at which each division piece is stored from the storage finishing log of the management information A written at the writing start position V (step S406 of FIG. 16).

FIG. 23 is a view illustrating an example of the storage finishing log of the management information A. In the example illustrated in FIG. 23, the division number of the management information A is four, the size of each division piece of the management information A is five blocks, and positions on the management information area in which respective division pieces are stored are Sa, Sb, Sc, and Sd.

Subsequently, the management information storing unit 53 frees the management information A from the management information area with reference to the division number of the management information A, the size of each division piece of the management information A, and the position on the management information area in which each division piece is stored which are obtained by the log storing unit 51 (step S408 of FIG. 16).

Figure 24:
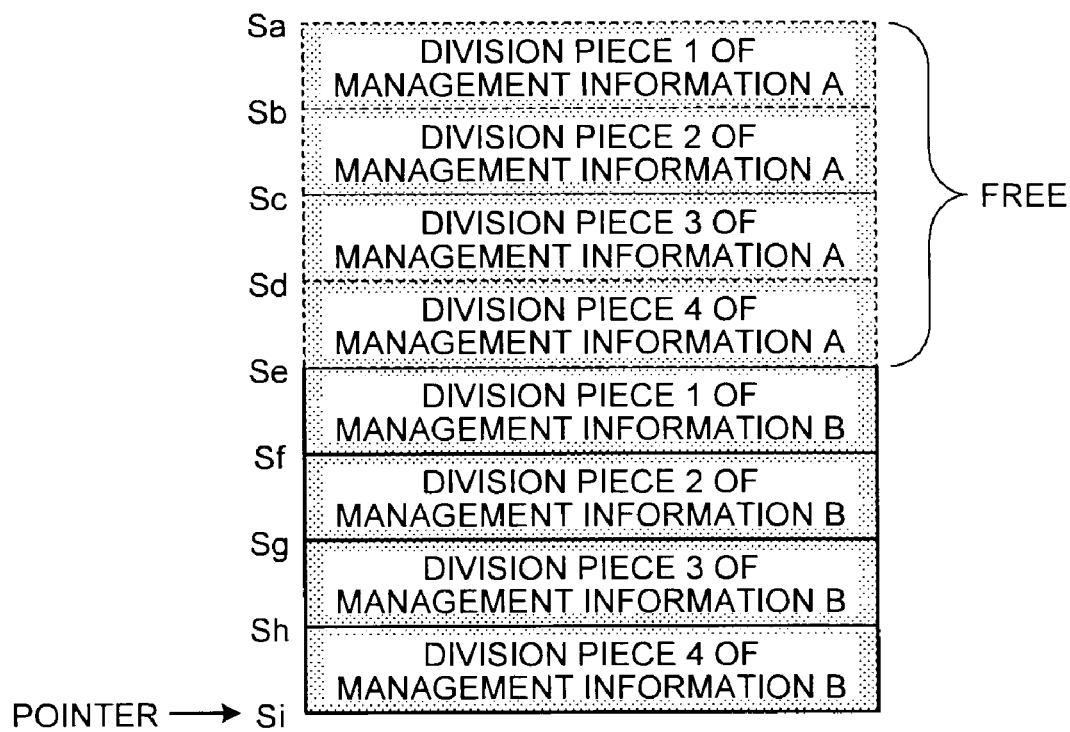
FIG. 24 is a schematic view illustrating a state of the management information area in the embodiment.

FIG. 24 is a schematic view illustrating an example of the state of a management information area after the management information A is freed. In the example illustrated in FIG. 24, the division pieces 1 to 4 of the management information A indicated by a dotted line are freed. That is, five blocks from each of the positions Sa, Sb, Sc, and Sd, that is, twenty blocks from the positions Sa to Se are freed.

Subsequently, the log storing unit 51 frees the logs written from the writing start position W to the writing start position U from the log area (step S410 of FIG. 16).

Figure 25:
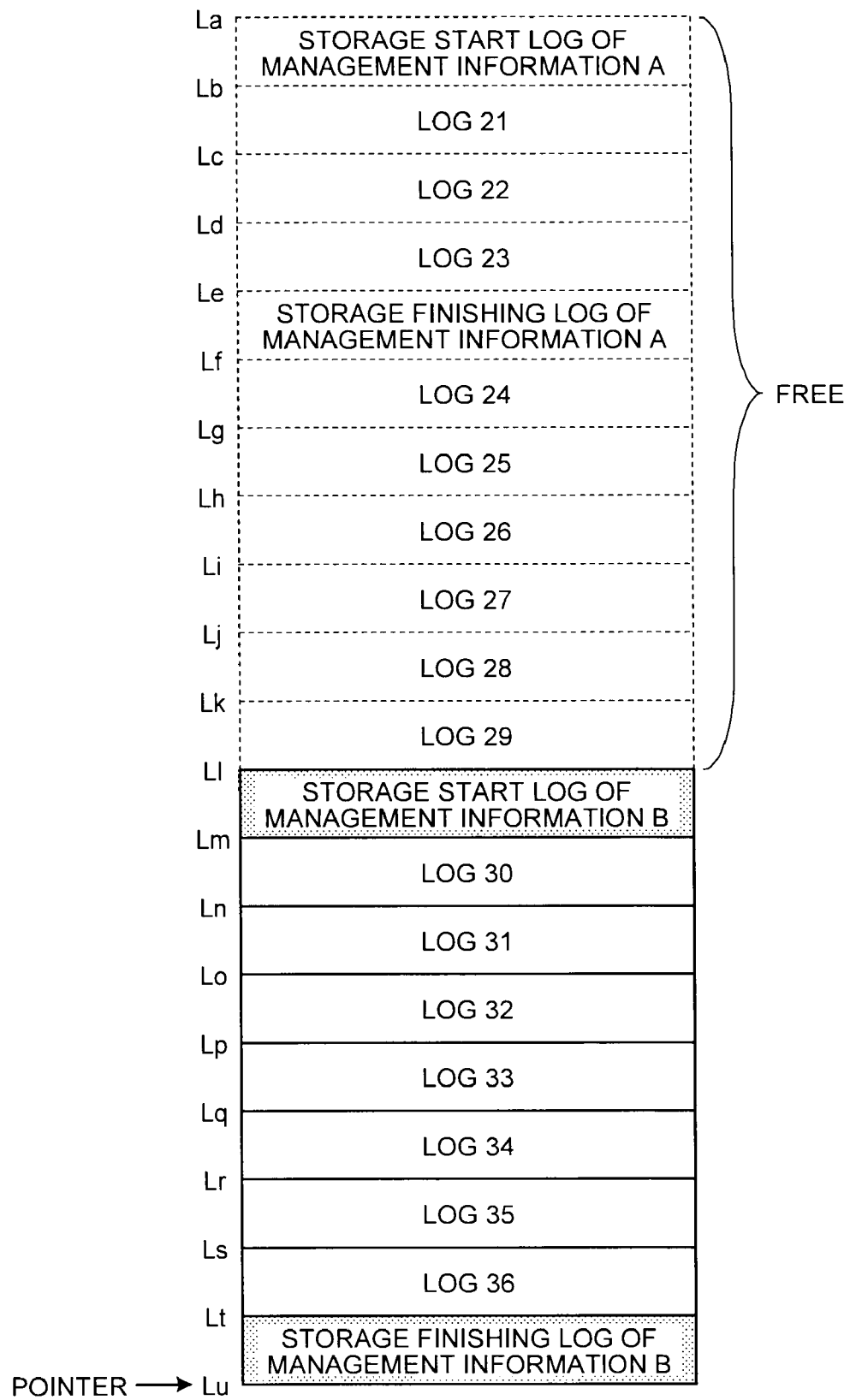
FIG. 25 is a schematic view illustrating a state of the log area in the embodiment.

FIG. 25 is a schematic view illustrating an example of the state of a log area after log freeing. In the example illustrated in FIG. 25, the storage start log and the storage finishing log of the management information A and logs 21 to 29 which are indicated by a dotted line are freed. That is, logs written at positions La to Lk are freed.

Subsequently, the second timer unit 48 receives an instruction from the management information storing unit 53, resets a time of the timer for management information storage process, and starts the timer for management information storage process (step S334 of FIG. 14). A time to be reset to the timer for management information storage process can be preferably set whenever storing the management information or as needed.

As described above, in the embodiment, the management information storing unit 53 stands ready to store a division piece for a predetermined time each time the management information storing unit 53 completes storing each division piece. Therefore, the main controller 32 can process a command received from the host device 2 while the division pieces are being stored, thereby preventing the performance from deteriorating while the management information is being stored.

Furthermore, in the embodiment, after the management information is stored, the previous management information is freed from the management information area, and an unnecessary log is freed from the log area. Therefore, the empty size of the management information area and the log area can be increased.

Next, a management information restoring operation performed by the data storage device according to the embodiment is described.

Figure 26:
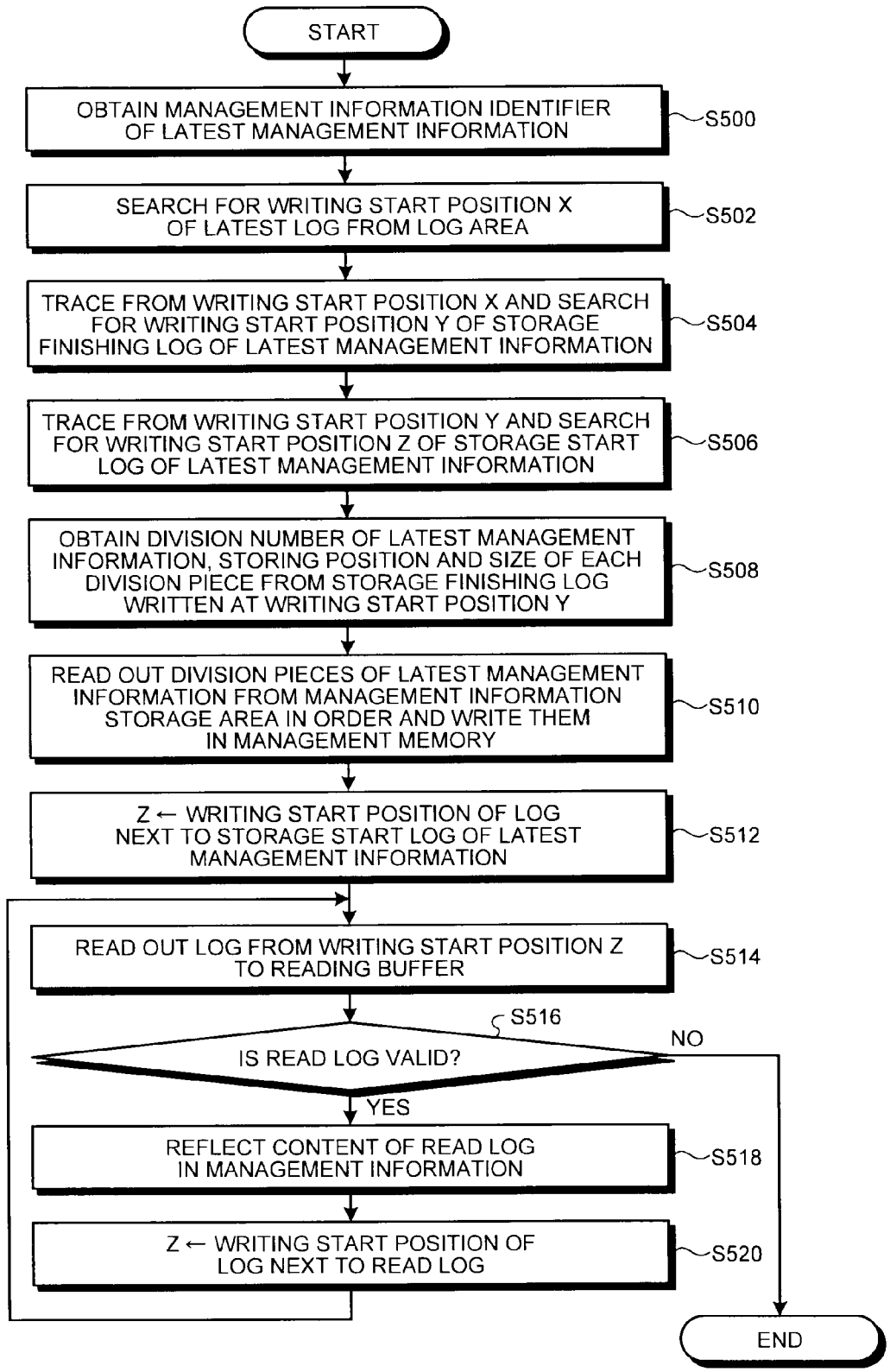
FIG. 26 is a flowchart illustrating a management information restoring process in the embodiment.

FIG. 26 is a flowchart illustrating an example of the flow of a management information restoring operation procedure performed by the data storage device 1 according to the embodiment.

First, the restoring unit 54 obtains the management information identifier of the latest management information from the identification information for identifying the latest management information (step S500).

Subsequently, the restoring unit 54 searches for a writing start position X of the latest log from the log area of the flash memory 11 (step S502). Specifically, the restoring unit 54 searches for the writing start position X of the latest log by obtaining the block identification information (refer to step S218 of FIG. 8) from the flash memory 11 to search for a block in which the latest log is written and investigating pages of the block in which the latest log is written in order.

Subsequently, the restoring unit 54 traces from the writing start position X and searches for a writing start position Y of the storage finishing log of the latest management information (step S504). Since a block number of a preceding block is written in a block used in the log area, the restoring unit 54 can trace old blocks by using the block number in order. The restoring unit 54 searches for the writing start position Y by searching for the management information identifier obtained in step S500.

Subsequently, the restoring unit 54 traces from the writing start position Y and searches for a writing start position Z of the storage start log of the latest management information (step S506). Since a block number of a preceding block is written in a block used in the log area, the restoring unit 54 can trace old blocks by using the block number in order. The restoring unit 54 searches for the writing start position Z by searching for the management information identifier obtained in step S500.

Subsequently, the restoring unit 54 obtains the division number of the latest management information, the size of each division piece of the latest management information, and a position on the management information area in which each division piece is stored from the storage finishing log of the latest management information written at the writing start position Y (step S508).

Subsequently, the restoring unit 54 reads out the division pieces of the latest management information from the management information area in order with reference to the division number of the latest management information, the size of each division piece of the latest management information, and the position on the management information area in which each division piece is stored which are obtained by the restoring unit 54 and writes them in the management memory 30 (step S510).

Subsequently, the restoring unit 54 updates the writing start position Z to a writing start position of a log next to the storage start log of the latest management information (step S512).

Subsequently, the restoring unit 54 reads out a log written at the writing start position Z to the reading buffer (step S514).

Subsequently, the restoring unit 54 checks whether or not the log read out to the reading buffer 44 is a valid log (step S516). When the log read out to the reading buffer 44 is not a valid log or when a log cannot be read out because a log is not written at the writing start position Z (No in step S516), the management information restoring process is finished.

When the log read out to the reading buffer 44 is a valid log (Yes in step S516), the restoring unit 54 reflects a content of the read log in the management information on the management memory 30 (step S518).

Subsequently, the restoring unit 54 updates the writing start position Z to a writing start position of a log next to the read log (step S520) and returns to step S514.

Through the above-described process, the log stored in the log area can be reflected in the management information in a storing order, and the latest management information can be restored. Particularly, in the embodiment, since the log stored in the log area is stored in a time order in which the update process of the management information is performed, a state of a result in which the update process is performed can be reproduced by reflecting in the management information in a time order starting from the old log.

Next, a specific example of the management information restoring process performed by the data storage device according to the embodiment is described.

FIG. 27 is a schematic view illustrating an example of the state of a log area of the flash memory 11. In the example illustrated in FIG. 27, the storage start log of the management information B is written at a position Ll, logs 30 to 36 are written at positions Lm to Ls, respectively, the storage finishing log of the management information B is written at a position Lt, and logs 37 to 41 are written at positions Lu to Ly, respectively.

FIG. 28 is a schematic view illustrating an example of the state of a management information area of the flash memory 11. In the example illustrated in FIG. 28, division pieces 1 to 4 of the management information B are written at positions Se to Sh.

Next, the management information restoring process in the state illustrated in FIGS. 27 and 28 is described with reference to the flowchart of FIG. 26.

First, the restoring unit 54 obtains the management information identifier of the management information B as the latest management information from the identification information for identifying the latest management information (step S500 of FIG. 26).

Subsequently, the restoring unit 54 searches for the writing start position X of the latest log from the log area of the flash memory 11 (step S502 of FIG. 26). In the example illustrated in FIG. 27, the writing start position X is the position Lz.

Subsequently, the restoring unit 54 traces from the writing start position X and searches for the writing start position Y of the storage finishing log of the management information B (step S504 of FIG. 26). In the example illustrated in FIG. 27, the writing start position Y is the position Lt.

Subsequently, the restoring unit 54 traces from the writing start position Y and searches for the writing start position Z of the storage start log of the management information B (step S506 of FIG. 26). In the example illustrated in FIG. 27, the writing start position Z is the position Ll.

Subsequently, the restoring unit 54 reads out the storage finishing log of the management information B written at the writing start position Y to the reading buffer 44 and obtains the division number of the management information B, the size of each division piece of the management information B, and the position on the management information area in which each division piece is stored (step S508 of FIG. 26).

FIG. 29 is a view illustrating an example of the storage finishing log of the management information B. In the example illustrated in FIG. 29, the division number of the management information A is four, the size of each division piece of the management information B is five blocks, and positions on the management information area in which respective division pieces are stored are Se, Sf, Sg, and Sh.

Subsequently, the restoring unit 54 reads out the division pieces 1 to 4 of the management information B from the management information area in order with reference to the division number of the management information B, the size of each division piece of the management information B, and the position on the management information area in which each division piece is stored which are obtained by the restoring unit 54 and writes them in the management memory 30 (step S510 of FIG. 26).

Subsequently, the restoring unit 54 updates the writing start position Z to a writing start position of a log next to the storage start log of the latest management information (step S512 of FIG. 26). In the example illustrated in FIG. 27, the writing start position Z is the position Lm.

Subsequently, the restoring unit 54 reads out a log 30 written at the writing start position Z to the reading buffer (step S514 of FIG. 26). Here, it is assumed that the log 30 is a valid log.

Subsequently, since the log 30 read out to the reading buffer 44 is a valid log, the restoring unit 54 reflects a content of the read log in the management information on the management memory 30 (Yes in step S516, and step S518 of FIG. 26).

For example, if the log 30 is a writing log as illustrated in FIG. 30, a translation table of the management information on the management memory 30 is updated in accordance with the writing log illustrated in FIG. 30. For example, the restoring unit 54 updates the translation table in accordance with a content in which data of a logical address 98 is written at the first page of a block having a chip number 9 and a block number 987.

For example, if the log 30 is a bad block log as illustrated in FIG. 31, a bad block list of the management information on the management memory 30 is updated in accordance with a bad block log illustrated in FIG. 31. For example, the restoring unit 54 registers a content in which a block having a chip number 12 and a block number 1122 becomes a bad block by an erase error in the bad block list.

As described above, since the process of reflecting the log in the management information is different depending on a content of the log, the restoring unit 54 preferably changes the process with reference to the log type.

Subsequently, the restoring unit 54 updates the writing start position Z to the writing start position of a log 31 next to the read log 30 (step S520) and returns to step S514.

Since the valid log disappears if this process is repeated to a log 41, the management information restoration process is finished.

As described above, in the embodiment, the management information update content performed until storing of the management information B is finished after it starts is stored in from the logs 30 to 36. The update content can be properly reflected in the management information by the management information restoring process.

For example, when the update content of the management information stored in the log 36 illustrated in FIG. 27 is the process for the division piece 1 of the already stored management information B, the content of the log 36 can be reflected by expanding the division piece 1 of the management information B. This achieves the same effect as that when an update process is performed.

For example, when the update content of the management information stored in the log 30 illustrated in FIG. 27 is the process for the division piece 4 of the management information B which is not stored yet at a point of time when the log 30 is stored, because the content of the log 30 is reflected at a point of time when the division piece 4 of the management information B is expanded, there is no problem even though the update process of the log 30 is repeated.

For example, when the logs 33 and 40 illustrated in FIG. 27 are those which store the update process for the same management information, because the log is stored in a stored order, that is, an order in which the update process is performed, the update process content can be properly reflected.

As described above, according to the embodiment, the management information storing unit 53 stands ready to store a division piece for a predetermined time every time the management information storing unit 53 completes storing each division piece. Therefore, the main controller 32 can process a command received from the host device 2 while storing the division pieces, thereby preventing the performance from deteriorating while storing the management information.

According to the embodiment, since the log stored in the log area is stored in a time order in which the update process of the management information is performed, a state of a result in which the update process is performed can be reproduced by reflecting in the management information in a time order starting from the old log.

The invention is not limited to the above-described embodiment as is, and a component may be modified and embodied without departing from the scope and spirit in an implementation step. Various inventions can be derived by an appropriate combination of plural components disclosed in the above-described embodiment. For example, several components of all components in the embodiment may be deleted. Further, components of different embodiments may be appropriately combined.

As described above in the embodiment, the NAND type flash memory requires the process of erasing a block in which data is written in order to rewrite already written data. Therefore, it is not easy to rewrite only a block number of a block to be used next or rewrite data in units of pages. Therefore, in the embodiment, described is an example in which when storing the log in the log area of the flash memory 11, a block to be used next is erased after writing a log in a block, and a block number of a block in which the log is previously written is written in the erased block. As a modified embodiment, described is an example in which when storing the log in the log area of the flash memory 11, a block to be used next is erased before writing a log in a block, and a block number of the erased block and a block number of a block in which the log is previously written are written.

Figure 32:
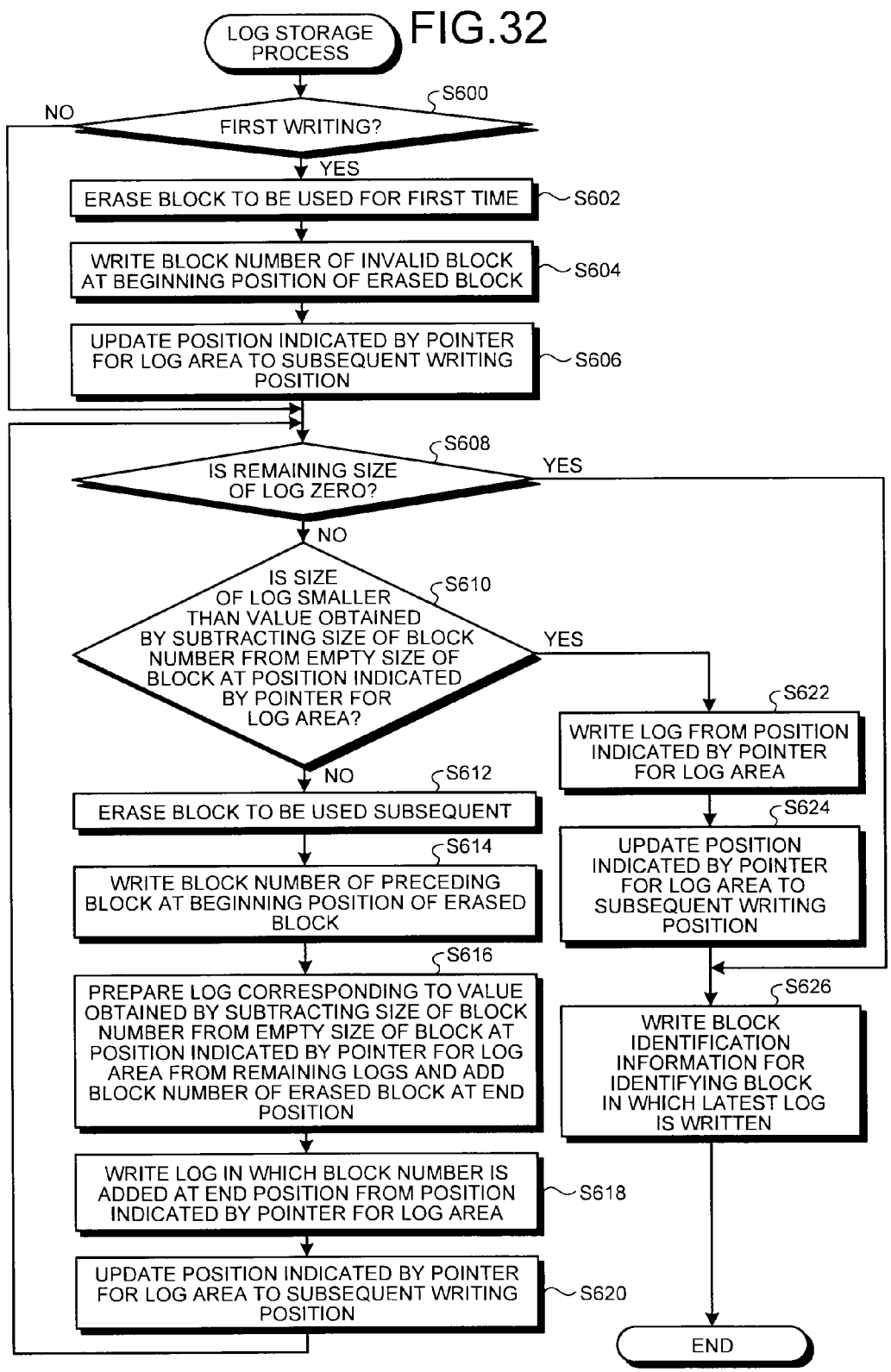
FIG. 32 is a flowchart illustrating a log storage process in a modified embodiment.

FIG. 32 is a flowchart illustrating an example of the flow of a log storage process procedure performed by the data storage device according to a modified embodiment.

First, the log storing unit 51 determines whether or not log writing to the flash memory 11 is the first time (step S600).

When log writing is not the first time (No in step S600), the log storing unit 51 proceeds to step S608. When log writing is the first time (Yes in step S600), the log storing unit 51 erases a block to be used for the first time (step S602) and writes a block number of an invalid block at a beginning position of the erased block (step S604). The log storing unit 51 updates a position indicated by the pointer for the log area to a next writing position (step S606).

Subsequently, the log storing unit 51 determines whether or not the remaining size of a log to be written in the flash memory 11 is zero (step S608).

When the remaining size of the log is not zero (No in step S608), the log storing unit 51 determines whether or not the remaining size of the log is smaller than a value obtained by subtracting a size of a block number from the empty size of a block at a position indicated by the pointer for the log area (step S610).

When the remaining size of the log is larger than a value obtained by subtracting a size of a block number from the empty size of a block at a position indicated by the pointer for the log area (No in step S610), the log storing unit 51 erases a block to be used next (step S612).

Subsequently, the log storing unit 51 writes a block number of a preceding block, that is, a block number of a block at a position indicated by the pointer for the log area, at a beginning position of the erased block (step S614).

Subsequently, the log storing unit 51 prepares a log corresponding to a value obtained by subtracting a size of a block number from the empty size of a block at a position indicated by the pointer for the log area and adds a block number of the erased block at an end position thereof (step S616).

Subsequently, the log storing unit 51 writes the log in which the block number is added at the end position, starting from the position indicated by the pointer for the log area (step S618).

Subsequently, the log storing unit 51 updates the position indicated by the pointer for the log area to a next writing position (step S620) and returns to step S608. Specifically, the log storing unit 51 updates the position indicated by the pointer for the log area to a position indicating a page next to a page in which a block number of the erased block is written.

The process of step S626 performed when it is determined in step S608 that the remaining size of the log is zero (Yes in step S608) is the same as the process of step S218 in the log storage process illustrated in FIG. 8.

The process of steps S622 to S626 performed when it is determined in step S610 that the remaining size of the log is smaller than a value obtained by subtracting a size of a block number from the empty size of a block at a position indicated by the pointer for the log area (Yes in step S610) is the same as the processes of steps S214 to S218 in the log storage process illustrated in FIG. 8.

Figure 33:
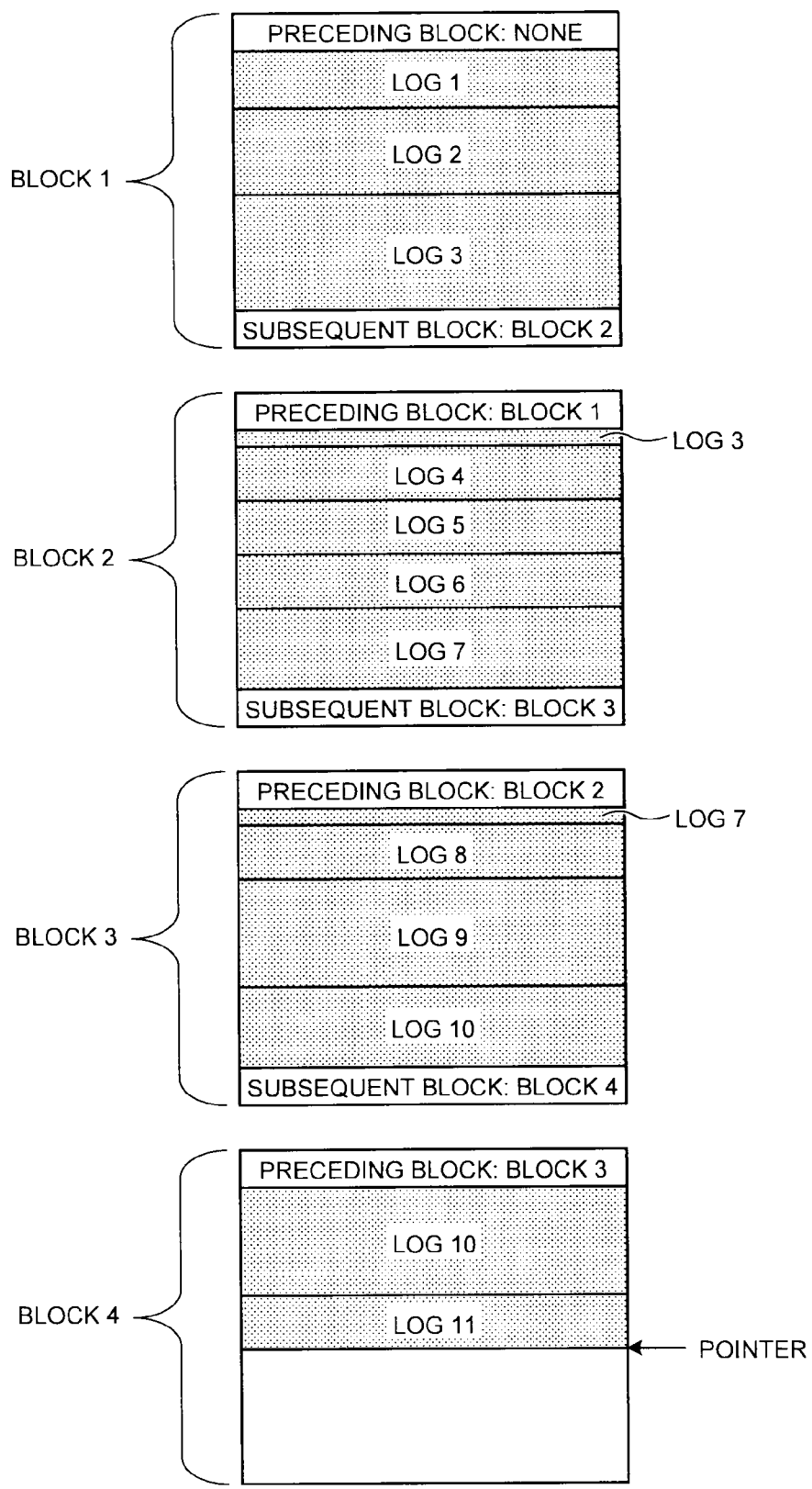
FIG. 33 is a schematic view illustrating a state of a log area in the modified embodiment.

FIG. 33 is a schematic view illustrating an example of the state of a log area after the log storage process according to the modified embodiment is finished. In the log storage process according to the modified embodiment, as illustrated in FIG. 33, since a block number of a preceding block and a block number of a subsequent block are written in each block, it is possible to trace from an old block to a new block as well as to trace from a new block to an old block. Therefore, redundancy of a block number to be written in each block is increased, and thus it is possible to cope with using a memory which needs an error countermeasure at the time of reading such as the NAND type flash memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A controller comprising:
a volatile management memory which stores management information for managing a use state of a storage medium;
a management information storing unit which divides the management information into a plurality of division pieces and individually stores each division piece in the storage medium;
a main controller which receives a command from a host device while the plurality of division pieces are being stored, performs data processing with respect to the storage medium in response to the command between each division piece is stored, updates the management information divided into the plurality of division pieces in accordance with a content of the data processing, and creates a log representing an update content of the management information;
a log storing unit which stores the log in the storage medium; and
a restoring unit which reads out the plurality of division pieces stored in the storage medium to the management memory as the management information, updates the management information in accordance with the log stored in the storage medium, and restores the updated management information, wherein
the log storing unit creates a storage start log representing that storing of the management information starts and stores the storage start log in a log area of the storage medium before storing the plurality of division pieces, and stores a plurality of logs created by the main controller in the log area in a time order after storing the storage start log, and
the restoring unit reflects update contents represented by the plurality of logs stored in the log area subsequent to the storage start log in the management information in a time order to restore the updated management information.

2. The controller according to claim 1, wherein the storage medium is a flash memory, a plurality of blocks are allocated to the log area, each block formed pages, each page being a minimum writing unit, and
the log storing unit stores a block number of a preceding block, in which a previous log is stored, in a new block when a log is stored in the new block.

3. The controller according to claim 2, wherein the log storing unit stores the block number of the preceding block at a beginning of the new block, performs, before storing the log in the new block, erasing a subsequent block that is to be used subsequent to the new block, stores the log in the new block when the erasing is successful, and stores a block number of the subsequent block at an end of the new block.

4. The controller according to claim 2, wherein the log storing unit stores block identification information for identifying a block in which the latest log is stored in the flash memory.

5. The controller according to claim 4, wherein the restoring unit searches for the block, in which the latest log is stored, with reference to the block identification information and traces a time order of the logs stored in the respective blocks with reference to the block numbers stored in the respective blocks that are allocated to the log area including the block, in which the latest log is stored, in order to search for the storage start log.

6. The controller according to claim 4, wherein the management information storing unit stores the plurality of division pieces in a management information storing area of the flash memory,
after storing the plurality of division pieces, the log storing unit creates a storage finishing log, which represents that storing of the management information is finished and specifies a position of each of the plurality of division pieces on the management information storing area, and stores the storage finishing log in the log area of the flash memory, and
the restoring unit reads out the plurality of division pieces from the management information storing area to the management memory as the management information with reference to the storage finishing log.

7. The controller according to claim 6, wherein the restoring unit searches for the block, in which the latest log is stored, with reference to the block identification information and traces a time order of the logs stored in the respective blocks with reference to the block numbers stored in the respective blocks that are allocated to the log area including the block, in which the latest log is stored, in order to search for the storage finishing log.

8. The controller according to claim 6, wherein the log storing unit traces a time order of the logs stored in the respective blocks to search for a previous storage finishing log with reference to the block numbers stored in the respective blocks that are allocated to the log area including the block in which the storage finishing log is stored, and
the management information storing unit frees each division piece of previous management information from the management information storing area with reference to the previous storage finishing log.

9. The controller according to claim 8, wherein the log storing unit traces a time order of the logs stored in the respective blocks to search for a previous storage finishing log and the storage start log with reference to the block numbers stored in the respective blocks that are allocated to the log area including the block in which the storage finishing log is stored, and frees the logs from the previous storage start log to the storage start log from the log storing area.

10. The controller according to claim 6, wherein a plurality of blocks are allocated to the management information storing area, and the management information storing unit sets a size of the division piece to an integer multiple of a size of the block and performs division.

11. A data storage device, comprising:

the controller according to claim 1; and a storage medium for which the data processing is performed by the controller.

12. A controller comprising:

a volatile management memory which stores management information for managing a use state of a storage medium;

a management information storing unit which divides the management information into a plurality of division pieces and individually stores each division piece in the storage medium, a size of the division piece being based on a page size of the storage medium;

a main controller which receives a command from a host device while the plurality of division pieces are being stored, performs, in between storing each division piece, data processing with respect to the storage medium in response to the command, updates the management information divided into the plurality of division pieces in accordance with a content of the data processing, and creates a log representing an update content of the management information;

a log storing unit which stores the log in the storage medium; and a restoring unit which reads out the plurality of division pieces stored in the storage medium to the management memory as the management information, updates the management information in accordance with the log stored in the storage medium, and restores the updated management information.

13. The controller according to claim 12, wherein the log storing unit creates a storage start log representing that storing of the management information starts and stores the storage start log in a log area of the storage medium before storing the plurality of division pieces, and stores a plurality of logs created by the main controller in the log area in a time order after storing the storage start log, and the restoring unit reflects update contents represented by the plurality of logs stored in the log area subsequent to the storage start log in the management information in a time order to restore the updated management information.

14. The controller according to claim 13, wherein the storage medium is a flash memory, a plurality of blocks are allocated to the log area, each block formed of pages, each page being a minimum writing unit, and the log storing unit stores a block number of a preceding block, in which a previous log is stored, in a new block when a log is stored in the new block.

15. The controller according to claim 14, wherein the log storing unit stores block identification information for identifying a block in which the latest log is stored in the flash memory.

16. The controller according to claim 15, wherein the restoring unit searches for the block, in which the latest log is stored, with reference to the block identification information and traces a time order of the logs stored in the respective blocks with reference to the block numbers stored in the respective blocks that are allocated to the log area including the block, in which the latest log is stored, in order to search for the storage start log.

17. The controller according to claim 15, wherein the management information storing unit stores the plurality of division pieces in a management information storing area of the flash memory, after storing the plurality of division pieces, the log storing unit creates a storage finishing log, which represents that storing of the management information is finished and specifies a position of each of the plurality of division pieces on the management information storing area, and stores the storage finishing log in the log area of the flash memory, and the restoring unit reads out the plurality of division pieces from the management information storing area to the management memory as the management information with reference to the storage finishing log.

18. The controller according to claim 17, wherein the restoring unit searches for the block, in which the latest log is stored, with reference to the block identification information and traces a time order of the logs stored in the respective blocks with reference to the block numbers stored in the respective blocks that are allocated to the log area including the block, in which the latest log is stored, in order to search for the storage finishing log.

19. The controller according to claim 17, wherein a plurality of blocks are allocated to the management information storing area, and the management information storing unit sets a size of the division piece to an integer multiple of a size of the block and performs division.

* * * * *